(12) United States Patent
Su et al.

(10) Patent No.: US 11,483,735 B2
(45) Date of Patent: Oct. 25, 2022

(54) INFORMATION TRANSMISSION METHOD AND APPARATUS

(71) Applicant: Huawei Technologies Co., Ltd., Shenzhen (CN)

(72) Inventors: Qi Su, Shanghai (CN); Yan Wang, Shanghai (CN); Yexing Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 165 days.

(21) Appl. No.: 16/934,789

(22) Filed: Jul. 21, 2020

(65) Prior Publication Data

US 2020/0351703 A1 Nov. 5, 2020

Related U.S. Application Data

(63) Continuation of application No. PCT/CN2019/070051, filed on Jan. 2, 2019.

(30) Foreign Application Priority Data

Jan. 22, 2018 (CN) .......................... 201810060201.9

(51) Int. Cl.
*H04W 28/02* (2009.01)
*H04W 28/10* (2009.01)
*H04W 72/04* (2009.01)

(52) U.S. Cl.
CPC ....... *H04W 28/0268* (2013.01); *H04W 28/10* (2013.01); *H04W 72/0453* (2013.01)

(58) Field of Classification Search
CPC ............. H04W 28/02; H04W 28/0252; H04W 28/0257; H04W 28/0263; H04W 28/0268;
(Continued)

(56) References Cited

U.S. PATENT DOCUMENTS 5,434,860 A * 7/1995 Riddle .................... H04L 47/10
370/235
6,044,396 A * 3/2000 Adams ................. H04N 19/192
375/E7.184
(Continued)

FOREIGN PATENT DOCUMENTS

CA         2200487 A1 * 3/1997 ............. H04L 12/56
CN     101621850 A     1/2010
(Continued)

OTHER PUBLICATIONS

"3rd Generation Partnership Project; Technical Specification Group Services and System Aspects; Service requirements for the 5G system; Stage 1 (Release 16)," 3GPP TS 22.261 V16.0.0, total 49 pages, 3rd Generation Partnership Project, Valbonne, France (Jun. 2017).

(Continued)

*Primary Examiner* — Kevin D Mew
(74) *Attorney, Agent, or Firm* — Leydig, Voit & Mayer, Ltd.

(57) ABSTRACT

This application provides an information transmission method and apparatus. The method includes: determining, by a control device, a first transmission channel in at least one transmission channel configured between a first network device and a second network device, where the first transmission channel is used to transmit a packet that belongs to at least one packet flow, a packet sending frequency currently supported by the first transmission channel is greater than or equal to a sum of packet sending frequencies of the at least one packet flow, and transmission performance of the first transmission channel meets transmission performance of the at least one packet flow; and sending, by the control device, first identification information to the first network device, where the first identification information is used to (Continued)

identify the first transmission channel. Therefore, this helps to meet a requirement for transmission performance of a packet in a mobile network.

12 Claims, 8 Drawing Sheets

(58) Field of Classification Search
CPC ..... H04W 28/10; H04W 28/12; H04W 28/18; H04W 28/22; H04W 72/044; H04W 72/0453
See application file for complete search history.

(56) References Cited

U.S. PATENT DOCUMENTS

| | | | | |
|---|---|---|---|---|
| 6,259,733 | B1* | 7/2001 | Kaye | H04N 19/162 375/E7.218 |
| 7,023,829 | B1* | 4/2006 | Holmquist | H04L 12/5601 370/312 |
| 7,453,805 | B2* | 11/2008 | Velev | H04W 28/0273 370/231 |
| 7,474,642 | B1 | 1/2009 | Chheda | |
| 7,593,433 | B1* | 9/2009 | Wu | H04J 14/0227 370/537 |
| 7,792,131 | B1* | 9/2010 | Ma | H04L 47/215 370/428 |
| 9,374,404 | B2* | 6/2016 | Strasman | H04L 65/80 |
| 2002/0001114 | A1* | 1/2002 | Fames | H04J 14/02 398/43 |
| 2002/0129159 | A1* | 9/2002 | Luby | H04L 69/14 709/236 |
| 2003/0063564 | A1* | 4/2003 | Ha | H04L 47/10 370/230 |
| 2003/0099255 | A1* | 5/2003 | Kekki | H04B 7/2612 370/535 |
| 2005/0063378 | A1* | 3/2005 | Kadous | H04L 1/1819 370/389 |
| 2005/0246751 | A1* | 11/2005 | Boyce | H04N 21/2662 370/395.43 |
| 2007/0091797 | A1* | 4/2007 | Ma | H04L 47/568 370/392 |
| 2008/0008092 | A1* | 1/2008 | Wang | H04L 47/24 370/235 |
| 2008/0032633 | A1 | 2/2008 | Harrison et al. | |
| 2008/0068997 | A1* | 3/2008 | Krause | H04N 21/262 370/232 |
| 2008/0310334 | A1* | 12/2008 | Nakamura | H04L 47/10 370/310 |
| 2009/0161765 | A1* | 6/2009 | Joyce | H04N 9/8042 375/240.23 |
| 2009/0249421 | A1* | 10/2009 | Liu | H04L 47/722 725/116 |
| 2009/0274131 | A1* | 11/2009 | Lee | H04W 72/085 370/338 |
| 2009/0293114 | A1* | 11/2009 | Mustafa | H04L 63/0227 726/13 |
| 2010/0067577 | A1* | 3/2010 | Porat | H04N 19/40 375/E7.243 |
| 2010/0214928 | A1* | 8/2010 | Nogami | H04L 1/0026 370/329 |
| 2013/0101052 | A1* | 4/2013 | Kaye | H04N 19/154 375/240.26 |
| 2013/0109422 | A1* | 5/2013 | Xie | H04W 72/0446 455/509 |
| 2013/0222695 | A1* | 8/2013 | Qin | H04N 21/43615 348/565 |
| 2015/0365153 | A1* | 12/2015 | Kim | H04B 7/0626 370/329 |
| 2020/0221467 | A1* | 7/2020 | Huang | H04W 72/0453 |

FOREIGN PATENT DOCUMENTS

| | | | | |
|---|---|---|---|---|
| CN | 101808044 | A | 8/2010 | |
| CN | 101986746 | A | 3/2011 | |
| CN | 103686211 | A | 3/2014 | |
| CN | 107135164 | A | 9/2017 | |
| CN | 104041109 | B | 11/2017 | |
| WO | WO-2012121635 | A1 * | 9/2012 | ............ H04L 47/12 |

OTHER PUBLICATIONS

"3rd Generation Partnership Project; Technical Specification Group Services and System Aspects; System Architecture for the 5G System; Stage 2 (Release 15)," 3GPP TS 23.501 V15.0.0, total 181 pages, 3rd Generation Partnership Project, Valbonne, France (Dec. 2017).
"3rd Generation Partnership Project; Technical Specification Group Services and System Aspects; Procedures for the 5G System; Stage 2 (Release 15)," 3GPP TS 23.502 V0.6.0, total 148 pages, 3rd Generation Partnership Project, Valbonne, France (Aug. 2017).
"3GPP PS Data Off—TS 23.502," SA WG2 Meeting #125, Gothenburg, Sweden, S2-180447, pp. 1-17, 3rd Generation Partnership Project, Valbonne, France (Jan. 22-26, 2018).
EP/19741076.4, Office Action, dated May 18, 2022.

* cited by examiner

INFORMATION TRANSMISSION METHOD AND APPARATUS

CROSS-REFERENCE TO RELATED APPLICATIONS

This application is a continuation of International Application No. PCT/CN2019/070051, filed on Jan. 2, 2019, which claims priority to Chinese Patent Application No. 201810060201.9, filed on Jan. 22, 2018. The disclosures of the aforementioned applications are hereby incorporated by reference in their entireties.

TECHNICAL FIELD

This application relates to the communications field, and more specifically, to an information transmission method and apparatus in the communications field.

BACKGROUND

A framework that is based on a quality of service (QoS) flow is defined in existing 5G. To be specific, in a session, different transmission requirements may be provided for packets based on the QoS flow. In other words, packets belonging to a same QoS flow may obtain a same transmission service.

In an existing 5G mobile network, a transmission requirement of the QoS flow is implemented by using differentiated services (DiffServ). For example, during uplink transmission, a base station may add a differentiated service code point (DSCP) field to the packets, where a DSCP value in the DSCP field is determined based on a parameter of the QoS flow. In this way, different QoS services may be differentiated by using the DSCP value. A switch in a network may allocate transmission queues with different priorities to the packets based on the DSCP field in the packets, thereby providing different transmission services for different packets.

A packet forwarding mechanism in the prior art is a best effort forwarding mechanism. To be specific, the switch first forwards a packet with a higher priority in the packets. When a large quantity of packets arrive at a port at one moment and there are a large quantity of packets with a same priority, it cannot be ensured that all packets with the same priority can be forwarded within a valid latency range due to factors such as a buffer capability of the port of the switch and lengths of the queues. To be specific, deterministic transmission performance cannot be provided for different packets. Especially, for an ultra-reliable and low-latency communication (URLLC) service, transmission performance of the URLLC service cannot be met in the prior art.

Therefore, a technology needs to be urgently provided, to help meet a requirement for transmission performance of a packet in a mobile network.

SUMMARY

This application provides an information transmission method and apparatus, to help meet a requirement for transmission performance of a packet in a mobile network.

According to a first aspect, an information transmission method is provided, including:

determining, by a control device, a first transmission channel in at least one transmission channel configured between a first network device and a second network device, where the first transmission channel is used to transmit a packet that belongs to at least one packet flow, a packet sending frequency currently supported by the first transmission channel is greater than or equal to a sum of packet sending frequencies of the at least one packet flow, and transmission performance of the first transmission channel meets transmission performance of the at least one packet flow; and sending, by the control device, first identification information to the first network device, where the first identification information is used to identify the first transmission channel.

Therefore, in the information transmission method in this embodiment of this application, the control device determines, in the at least one transmission channel configured between the first network device and the second network device, the first transmission channel used to transmit the packet that belongs to the at least one packet flow. In addition, by using the identification information used to identify the first transmission channel, the first network device may determine that the first transmission channel can be used to transmit the packet that belongs to the at least one packet flow. The packet sending frequency of the first transmission channel is greater than or equal to the packet sending frequency of the at least one packet flow, and the transmission performance of the first transmission channel meets the transmission performance of the at least one packet flow. Therefore, when sending the packet that belongs to the at least one packet flow, the first network device may send the packet based on the packet sending frequency of the first transmission channel by using the first transmission channel, so that a transmission delay of the packet may be effectively reduced, and a requirement for transmission performance of a packet in a mobile network may further be met.

In a possible design, the method further includes:

sending, by the control device, first indication information to the first network device, where the first indication information is used to indicate the at least one packet flow.

In a possible design, the method further includes:

sending, by the control device, frequency information of a first packet flow to a terminal device, where the frequency information of the first packet flow is used to indicate a packet sending frequency of each of the at least one packet flow.

Therefore, in the information transmission method provided in this embodiment of this application, the control device sends the frequency information that is of the first packet flow and that is used to indicate the packet sending frequency of each of the at least one packet flow, to the terminal device, so that the terminal device may send the packet by using a packet sending frequency corresponding to the packet flow to which the packet belongs. Therefore, a problem in which transmission performance of a packet of another packet flow is affected may be effectively avoided because the terminal device sends the packet based on the packet sending frequency of the packet flow.

In a possible design, the method further includes:

sending, by the control device, second identification information and frequency information of a second packet flow to a third network device, where the second identification information and the frequency information of the second packet flow are used to update the frequency information of the first transmission channel, and the frequency information of the first transmission channel is used to indicate the packet sending frequency currently supported by the first transmission channel; and the second identification information is used to identify the first transmission channel, and the frequency information of the second packet flow is used to indicate the packet sending frequency of each of the at least one packet flow or indicate the sum of the packet sending frequencies of the at least one packet flow.

Therefore, in the information transmission method in this embodiment of this application, the control device sends the second identification information and the frequency information of the second packet flow to the third network device, so that the third network device may update the packet sending frequency of the first transmission channel based on the second identification information and the frequency information of the second packet flow in real time. In this way, a packet sending frequency that can be currently supported by the first transmission channel can be accurately reflected, and real and valid data is provided for another packet flow to select a transmission channel, thereby ensuring normal transmission of the packet in all packet flows as much as possible.

In a possible design, the method further includes:

determining, by the control device, the frequency information of the first transmission channel based on the first transmission channel, where the frequency information of the first transmission channel is used to indicate the packet sending frequency currently supported by the first transmission channel;

obtaining, by the control device, frequency information of a second packet flow, where the frequency information of the second packet flow is used to indicate the packet sending frequency of each of the at least one packet flow or indicate the sum of the packet sending frequencies of the at least one packet flow; and generating, by the control device, updated frequency information of the first transmission channel based on the frequency information of the first transmission channel and the frequency information of the second packet flow.

Therefore, in the information transmission method in this embodiment of this application, the control device updates the packet sending frequency of the first transmission channel in real time by using the frequency information of the first transmission channel and the frequency information of the second packet flow. In this way, a packet sending frequency that can be currently supported by the first transmission channel can be accurately reflected, and real and valid data is provided for another packet flow to select a transmission channel, thereby ensuring normal transmission of the packet in all packet flows as much as possible.

In a possible design, the generating, by the control device, updated frequency information of the first transmission channel based on the frequency information of the first transmission channel and the frequency information of the second packet flow includes:

subtracting, by the control device when the frequency information of the second packet flow is used to indicate the packet sending frequency of each of the at least one packet flow, the packet sending frequency of each packet flow from the packet sending frequency currently supported by the first transmission channel, to generate the updated frequency information of the first transmission channel;

adding, by the control device when the frequency information of the second packet flow is used to indicate the packet sending frequency of each of the at least one packet flow, a packet sending frequency corresponding to each packet flow to the packet sending frequency currently supported by the first transmission channel, to generate the updated frequency information of the first transmission channel;

subtracting, by the control device when the frequency information of the second packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or adding, by the control device when the frequency information of the second packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel.

In a possible design, the determining, by a control device, a first transmission channel from at least one transmission channel configured between a first network device and a second network device includes:

determining, by the control device, the first transmission channel in the at least one transmission channel based on the transmission performance of each of the at least one packet flow, the transmission performance of each of the at least one transmission channel, the packet sending frequency of each of the at least one packet flow, and the packet sending frequency currently supported by each of the at least one transmission channel.

In a possible design, the first network device is any one of the following devices: an access network device, a user plane function network element, or an application server.

According to a second aspect, an information transmission method is provided, including:

receiving, by a first network device, first identification information from a control device, where the first identification information is used to identify a first transmission channel in at least one transmission channel configured between the first network device and a second network device, the first transmission channel is used to transmit a packet that belongs to at least one packet flow, a packet sending frequency currently supported by the first transmission channel is greater than or equal to a sum of packet sending frequencies of the at least one packet flow, and transmission performance of the first transmission channel meets transmission performance of the at least one packet flow;

determining, by the first network device, that a packet flow to which a first packet belongs to the at least one packet flow; and sending, by the first network device based on the packet sending frequency of the first transmission channel by using the first transmission channel, a second packet generated based on the first packet.

Therefore, in the information transmission method in this embodiment of this application, the first network device receives the identification information that is used to identify the first transmission channel and that is sent by the control device, so that the first network device may determine that the first transmission channel can be used to transmit the packet that belongs to the at least one packet flow. The packet sending frequency of the first transmission channel is greater than or equal to the packet sending frequency of the at least one packet flow, and the transmission performance of the first transmission channel meets the transmission performance of the at least one packet flow. Therefore, when sending the packet that belongs to the at least one packet flow, the first network device may send the packet based on the packet sending frequency of the first transmission channel by using the first transmission channel, so that a transmission delay of the packet may be effectively reduced, and a requirement for transmission performance of a packet in a mobile network may further be met.

In a possible design, the method further includes:

receiving, by the first network device, first indication information from the control device, where the first indication information is used to indicate the at least one packet flow; and the determining, by the first network device, that a packet flow to which a first packet belongs to the at least one packet flow includes:

determining, by the first network device based on the first indication information and a field of the first packet, that the packet flow to which the first packet belongs to the at least one packet flow, where the field of the first packet is used to indicate the at least one packet flow.

In a possible design, the first network device is any one of the following devices: an access network device, a user plane function network element, or an application server.

According to a third aspect, an information transmission method is provided, including:

receiving, by a third network device, identification information and frequency information of a packet flow from a control device, where the identification information is used to identify a first transmission channel in at least one transmission channel configured between a first network device and a second network device, the first transmission channel is used to transmit a packet that belongs to at least one packet flow, and the frequency information of the packet flow is used to indicate a packet sending frequency of each of the at least one packet flow or indicate a sum of packet sending frequencies of the at least one packet flow;

determining, by the third network device, frequency information of the first transmission channel based on the identification information, where the frequency information of the first transmission channel is used to indicate a packet sending frequency currently supported by the first transmission channel; and generating, by the third network device, updated frequency information of the first transmission channel based on the frequency information of the first transmission channel and the frequency information of the packet flow.

Therefore, in the information transmission method in this embodiment of this application, the control device sends the identification information and the frequency information of the packet flow to the third network device, so that the third network device may update the packet sending frequency of the first transmission channel based on the identification information and the frequency information of the packet flow in real time. In this way, a packet sending frequency that can be currently supported by the first transmission channel can be accurately reflected, and real and valid data is provided for another packet flow to select a transmission channel, thereby ensuring normal transmission of the packet in all packet flows as much as possible.

In a possible design, the generating, by the third network device, updated frequency information of the first transmission channel based on the frequency information of the first transmission channel and the frequency information of the packet flow includes:

subtracting, by the third network device when the frequency information of the packet flow is used to indicate the packet sending frequency of each of the at least one packet flow, the packet sending frequency of each packet flow from the packet sending frequency currently supported by the first transmission channel, to generate the updated frequency information of the first transmission channel;

adding, by the third network device when the frequency information of the packet flow is used to indicate the packet sending frequency of each of the at least one packet flow, a packet sending frequency corresponding to each packet flow to the packet sending frequency currently supported by the first transmission channel, to generate the updated frequency information of the first transmission channel;

subtracting, by the third network device when the frequency information of the packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or adding, by the third network device when the frequency information of the packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel.

According to a fourth aspect, an information transmission method is provided, including:

receiving, by a terminal device, frequency information of a first packet flow from a control device, where the frequency information of the first packet flow is used to indicate a packet sending frequency of each of at least one packet flow;

determining, by the terminal device in the frequency information of the first packet flow based on a packet flow to which a packet belongs, a packet sending frequency of the packet flow to which the packet belongs, where the packet flow belongs to the at least one packet flow; and sending, by the terminal device, the packet based on the packet sending frequency of the packet flow to which the packet belongs.

Therefore, in the information transmission method provided in this embodiment of this application, the control device sends the frequency information that is of the first packet flow and that is used to indicate the packet sending frequency of each of the at least one packet flow, to the terminal device, so that the terminal device may send the packet by using a packet sending frequency corresponding to the packet flow to which the packet belongs. Therefore, a problem in which transmission performance of a packet of another packet flow is affected may be effectively avoided because the terminal device sends the packet based on the packet sending frequency of the packet flow.

According to a fifth aspect, an information transmission apparatus is provided. The apparatus may be configured to implement operations in any one of the first aspect to the fourth aspect and any possible implementation of the aspects. For example, the apparatus may include modules or units configured to implement the operations in any one of the first aspect to the fourth aspect or any possible implementation of the aspects.

According to a sixth aspect, an information transmission apparatus is provided. The apparatus includes a processor, a transceiver, and a memory. The processor, the transceiver, and the memory communicate with each other through an inner connection path. The memory is configured to store an instruction. The processor is configured to execute the instruction stored in the memory. When the processor executes the instruction stored in the memory, the apparatus is enabled to perform any method in any one of the first aspect to the fourth aspect or any possible implementation of the aspects.

According to a seventh aspect, a chip system is provided. The chip system includes a memory and a processor. The memory is configured to store a computer program. The processor is configured to invoke the computer program from the memory and run the computer program, so that a communications device in which the chip system is installed performs any method in the first aspect to the fourth aspect and possible implementations of the aspects.

According to an eighth aspect, a computer program product is provided. The computer program product includes computer program code. When the computer program code is executed by a communications unit and a processing unit or a transceiver and a processor that are of a communications device (for example, a control device, a first network device, a third network device, or a terminal device), the communications device is enabled to perform any method in the first aspect to the fourth aspect and possible implementations of the aspects.

According to a ninth aspect, a computer-readable storage medium is provided. The computer-readable storage medium stores a program, and the program enables a communications device (for example, a control device, a first network device, a third network device, or a terminal device) to perform any method in the first aspect to the fourth aspect and possible implementations of the aspects.

According to a tenth aspect, a computer program is provided. When being executed on a computer, the computer program enables the computer to perform any method in the first aspect to the fourth aspect and possible implementations of the aspects.

In some implementations, the control device obtains transmission channel information, where the transmission channel information includes information used to indicate transmission performance of each transmission channel and information used to indicate a packet sending frequency currently supported by each transmission channel.

DESCRIPTION OF EMBODIMENTS

Figure 1:
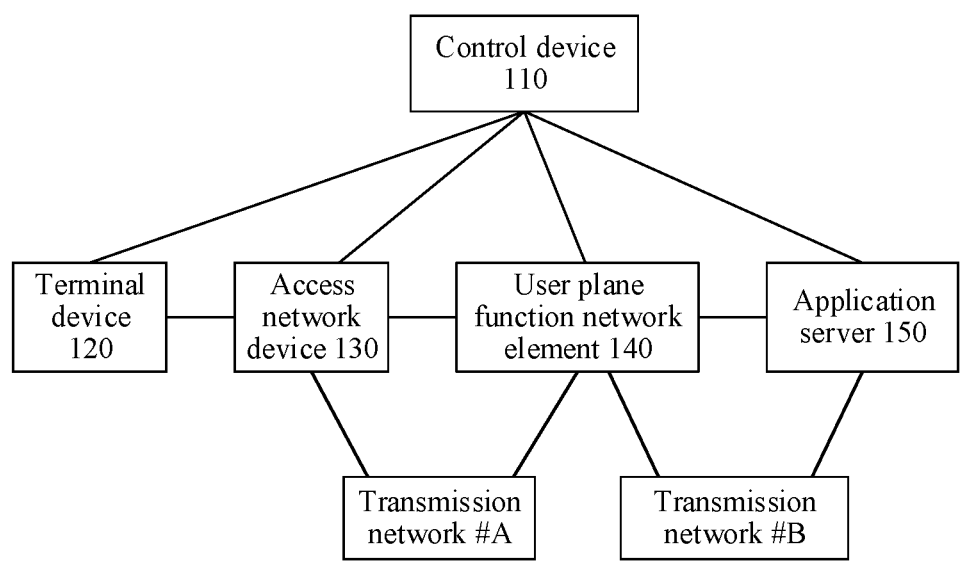
FIG. 1 is a schematic diagram of a possible network architecture according to an embodiment of this application.

The following describes technical solutions in this application with reference to accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) communications system.

With the comprehensive and in-depth research on the next-generation communications system, 5G will support various types of network deployment and applications, including: higher-rate experience and a larger-bandwidth access capability, for example, enhanced mobile broadband (eMBB); access and management of larger-scale and lower-cost machine type devices, such as massive machine type communication (mMTC); information exchange of lower latency and higher reliability, such as ultra-reliable and low-latency communication (URLLC). To satisfy the foregoing requirement, a framework that is based on a quality of service (QoS) flow is defined in 5G. The framework may support a QoS flow whose flow rate is guaranteed or a QoS flow whose flow rate is not guaranteed.

In an existing 5G network, a transmission requirement of the QoS flow is implemented by using differentiated services DiffServ). For example, during uplink transmission, a base station may add a differentiated service code point (DSCP) field to a packet, where a DSCP value in the DSCP field is determined based on a parameter of the QoS flow. A switch in a network may allocate transmission queues with different priorities to packets based on the DSCP field in the packets, thereby providing different transmission services for different packets.

However, a packet forwarding mechanism in the prior art is a best-effort forwarding mechanism. When a large quantity of packets arrive at a port at one moment, the switch first forwards only a packet with a higher priority in the packets. However, when there are a large quantity of packets with a same priority, it cannot be ensured that all packets with the same priority can be forwarded within a valid latency range due to factors such as a buffer capability of the port of the switch and lengths of the queues. Therefore, a transmission network in the prior art is a best-effort network. For packets of any transmission priority, deterministic transmission performance cannot be provided for different packets in the prior art. Especially, for a URLLC service, an existing best-effort transmission network cannot meet transmission performance of the URLLC service, and data transmission efficiency is greatly affected.

Therefore, embodiments of this application provide an information transmission method, to help meet a requirement for transmission performance of a packet in a mobile network.

The following describes the embodiments of this application in detail with reference to FIG. 1 to FIG. 6.

A network architecture in an embodiment of this application is first briefly described. FIG. 1 is a schematic diagram of a possible network architecture 100 according to an embodiment of this application. As shown in FIG. 1, the network architecture 100 includes a control device 110, a terminal device 120, an access network device 130, a user plane function (UPF) network element 140, and an application server 150. The following briefly describes each device.

The control device 110 is mainly configured to send various information used to send a packet, to a device (for example, any one of the terminal device 120, the access network device 130, the user plane function network element 140, and the application server 150) that is communicatively connected to the control device. For example, the information is first identification information, first indication information, and the like in the following specification.

Optionally, the control device 110 may be a session management function (SMF) network element. The SMF network element is mainly configured to: perform session management, allocate and manage an IP address for the terminal device, and select and control a UPF network element. The SMF network element may further be configured to control a destination to which the UPF network element forwards traffic, policy execution in a control aspect, and QoS management.

The terminal device 120 may include user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

The access network device 130 is configured to provide a network access function for an authorized user in a specific area, and may use, based on a requirement of a user service or the like, transmission tunnels having different quality. The access network device 130 may manage a radio resource, provide an access service for the terminal device, and further complete forwarding of a control signal and user data between the terminal device and a core network. The access network device may also be understood as a base station in a conventional network.

The access network device in this embodiment of this application may be a base transceiver station (BTS) in the GSM system or the CDMA system, a NodeB (NB) in the WCDMA system, an evolved NodeB (evolutional nodeB, eNB or eNodeB) in the LTE system, a radio controller in a cloud radio access network (CRAN) scenario, or a gNB (gNodeB). Alternatively, the access network device may be a relay station, an access point, the vehicle-mounted device, the wearable device, the network device in the future 5G network, the network device in the future evolved PLMN network, or the like. This is not limited in this embodiment of this application.

The UPF network element 140 is configured to: route and forward packet data, perform QoS processing on user plane data, and the like.

The application server 150 indicates a service end device that needs to be accessed by the terminal device by using the mobile network, and is configured to provide a service for the terminal device. This may be understood as an implementation part of service logic.

It should be understood that the devices included in the network architecture 100 are merely described as examples, and the network architecture 100 further includes another device, and the another device is not shown in FIG. 1. For example, the network architecture 100 includes a data network element. For example, the data network element may be a unified data management (UDM) network element, and is mainly configured to perform authentication credential processing, user identifier processing, access authorization, subscription management, and the like. In addition, in this embodiment of this application, the data network element may further be configured to maintain transmission channel information in a network. For another example, the network architecture 100 further includes an access and mobility management function (AMF) network element, mainly configured to perform mobility management, access management, and the like. The AMF network element may be configured to implement another function in a mobility management entity (MME) function other than session management, for example, functions such as lawful interception and access authorization/authentication.

In FIG. 1, a network between the access network device 130 and the UPF 140 is a transmission network #A, and a network between the UPF 140 and the application server 150 is a transmission network #B. The packet is transmitted between the terminal device 120 and the access network device 130 by using an air interface. Each transmission network includes at least a transmit end of the packet, a receive end of the packet, and a switch or a router configured to forward the packet (only the transmit end and the receive end in the transmission network are shown in the figure, and the switch or the router in the transmission network is not shown). For the transmission network #A, during uplink transmission, the transmit end is the access network device 130, and the receive end is the UPF network element 140; and during downlink transmission, the transmit end is the UPF network element 140, and the receive end is the access network device 130. For the transmission network #B, during uplink transmission, the transmit end is the UPF network element 140, and the receive end is the application server 150; and during downlink transmission, the transmit end is the application server 150, and the receive end is the UPF network element 140.

In each transmission network, at least one transmission channel used to transmit the packet is pre-configured in a system. The transmission channel herein may be understood as a transmission resource used to transmit the packet, and transmission resources of any two transmission channels are different. In the embodiments of this application, one transmission channel includes a plurality of parameters. It should be noted that a plurality of UPF network elements (for example, a target UPF network element and an anchor UPF network element in the following method 500) may further be included in FIG. 1, and at least one transmission channel may alternatively be pre-configured in a transmission network between two adjacent UPF network elements.

The following describes the parameters of the transmission channel by using one transmission channel as an example.

A first-type identifier of the transmission channel is used to identify the transmission channel. The first-type identifier of the transmission channel is an identifier for one transmission network. To be specific, in different transmission networks, first-type identifiers of transmission channels of different transmission channels may be the same. However, in a same transmission network, first-type identifiers of transmission channels of different transmission channels are different.

A second-type identifier of the transmission channel is used to uniquely identify the transmission channel. The second-type identifier of the transmission channel is specific to an identifier in an entire mobile network including at least one transmission network. To be specific, in a range of the entire mobile network, second-type identifiers of transmission channels of different transmission channels are different.

An identifier of the transmit end is used to uniquely identify a transmit end of a packet in the range of the entire mobile network. For example, for uplink transmission of a packet in the transmission network #A, the identifier of the transmit end is used to identify the access network device 130.

An identifier of the receive end is used to uniquely identify a receive end of the packet in the range of the entire mobile network. For example, for uplink transmission of the packet in the transmission network #A, the identifier of the receive end is used to identify the UPF network element 140.

Transmission performance of the transmission channel indicates performance of a deterministic transmission service that can be provided by the transmission channel in a packet transmission process. The performance of the deterministic transmission service includes at least one of a maximum latency of packet transmission, a maximum delay variation of the packet transmission, and reliability of a packet transmission service.

In the embodiments of this application, in a same transmission network, one transmission channel may correspond to at least one packet flow. To be specific, one transmission channel is used to transmit a packet that belongs to the at least one packet flow. Each packet flow includes at least the following parameters.

Transmission performance of a packet flow is performance of the deterministic service transmission required by the packet flow. The performance of the deterministic transmission service includes at least one of a maximum latency of packet transmission, a maximum delay variation of packet transmission, and reliability of the packet transmission service.

A packet sending frequency of the packet flow is a maximum packet sending frequency required by the packet flow.

A related parameter of the packet flow may be pre-configured in a system, for example, may be pre-configured in any network element having a data maintenance function, for example, the UDM network element.

In the embodiments of this application, the packet flow may be understood as a general term of a group of packets that meet a preset condition. There may be a plurality of preset conditions. For example, the preset condition may be that target IP addresses of packets in the packet flow are the same, may be that port numbers of the packets in the packet flow are the same, or may be that QoS of the packets in the packet flow is the same.

Certainly, the preset condition may alternatively be any combination of the foregoing plurality of preset conditions. This is not limited in the embodiments of this application. For example, if a plurality of packets have a same source IP, a same destination IP, a same protocol, and a same port number, the foregoing packets with the four same parameters may be grouped into one packet flow.

It should be understood that the preset condition of the packet flow listed above is merely described as an example, and any preset condition that can be used to distinguish the packet flow falls within the protection scope of the embodiments of this application.

Figure 2:
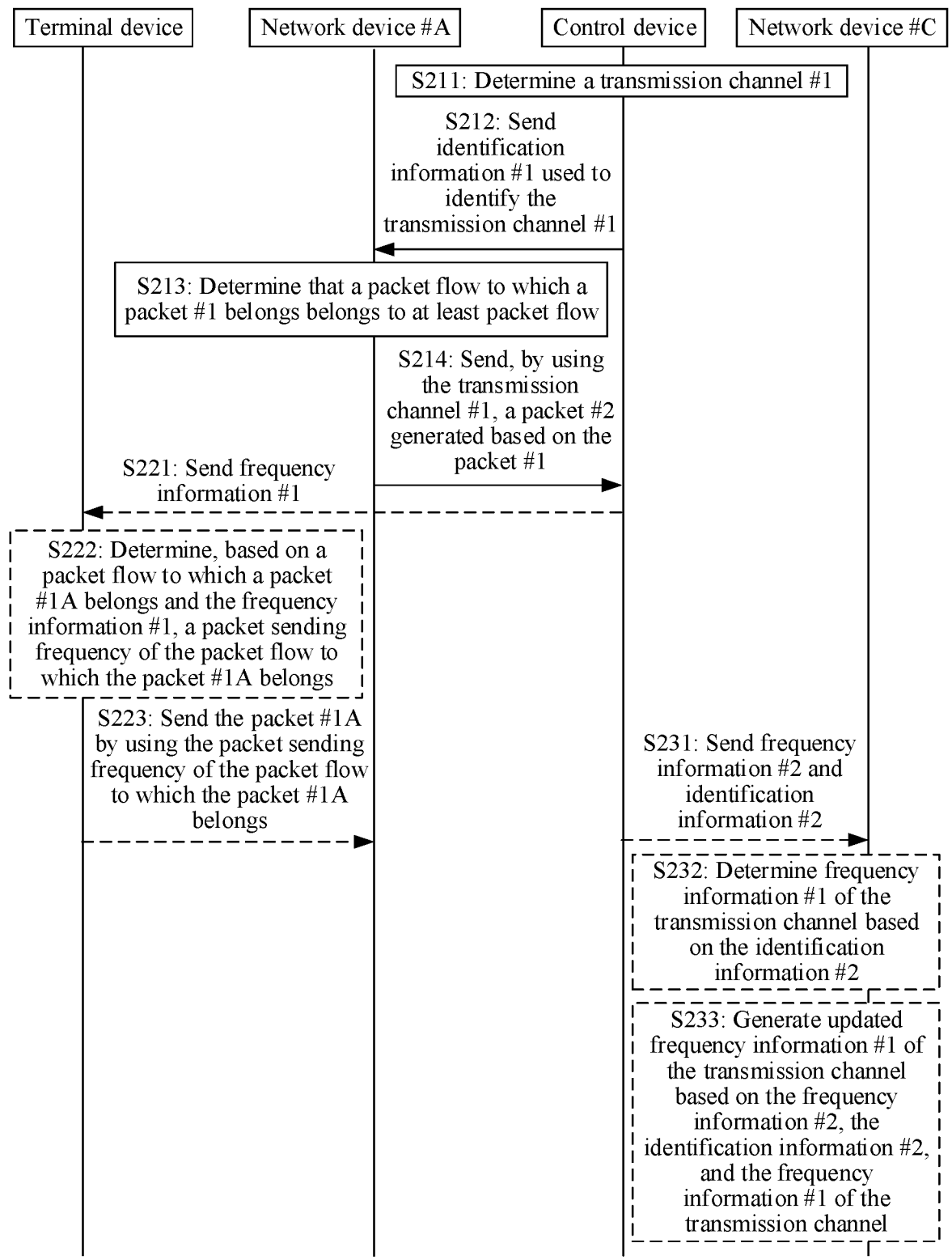
FIG. 2 is a schematic interaction diagram of an information transmission method according to an embodiment of this application.

FIG. 2 is a schematic interaction diagram of an information transmission method according to an embodiment of this application.

In this embodiment of this application, for ease of differentiation and understanding, a transmission network between an access network device and a UPF network element is denoted as a transmission network #A, a transmission network between the UPF network element and an application server is denoted as a transmission network #B, a first network device is denoted as a network device #A, and a second network device is denoted as a network device #B.

The network device #A is a transmit end in a transmission network, and the network device #B is a receive end in the transmission network. In addition, the transmission network further includes a switch configured to forward a packet. The network device #A may be any one of the access network device, the UPF network element, or the application server.

For example, in the transmission network #A, in uplink transmission, the network device #A is the access network device, and the network device #B is the UPF network element; and in downlink transmission, the network device #A is the UPF network element, and the network device #B is the access network device. In the transmission network #B, in uplink transmission, the network device #A is the UPF network element, and the network device #B is the application server; and in downlink transmission, the network device #A is the application server, and the network device #B is the UPF network element.

In step S211, a control device determines a first transmission channel (denoted as a transmission channel #1 for ease of differentiation and understanding) in at least one transmission channel configured between the network device #A and the network device #B. The transmission channel #1 is used to transmit a packet that belongs to at least one packet flow. A packet sending frequency currently supported by the transmission channel #1 is greater than or equal to a sum of packet sending frequencies of the at least one packet flow, and transmission performance of the transmission channel #1 meets transmission performance of the at least one packet flow.

Optionally, the control device is an SMF network element.

For example, the at least one transmission channel is pre-configured in a transmission network between the network device #A and the network device B, and the control device may obtain, based on a session of the terminal device, a packet flow corresponding to the session, to determine, for the packet flow corresponding to the session, a transmission channel that meets a condition. The transmission channel determined based on the packet flow of the session may be one transmission channel, or may be a plurality of transmission channels, provided that the condition is met. This is not limited in this embodiment of this application.

The following uses the transmission channel #1 in the transmission channel determined based on the packet flow of the session, as an example for description. The transmission channel #1 corresponds to the at least one packet flow. To be specific, the transmission channel #1 is used to transmit a packet that belongs to the at least one packet flow. In other words, a packet flow to which the packet transmitted on the transmission channel #1 belongs to the at least one packet flow. The at least one packet flow belongs to the packet flow corresponding to the session.

The control device determines the transmission channel #1 based on at least two parameters: the packet sending frequency and the transmission performance.

Optionally, that the control device determines the first transmission channel in the at least one transmission channel configured between the first network device and the second network device includes:

determining, by the control device, the first transmission channel in the at least one transmission channel based on transmission performance of each of the at least one packet flow, transmission performance of a transmission channel in the at least one transmission channel, the packet sending frequency of each of the at least one packet flow, and a packet sending frequency currently supported by the transmission channel in the at least one transmission channel.

For example, the control device obtains a parameter of the at least one packet flow. A parameter of a packet flow includes at least transmission performance and a packet sending frequency that are of the packet flow. In addition, the control device obtains at least two parameters of the transmission channel in the at least one transmission channel: the transmission performance of the transmission channel and the packet sending frequency currently supported by the transmission channel. In this way, the control device determines the transmission channel #1 in the at least one transmission channel based on the packet sending frequency of the packet flow, the packet sending frequency currently supported by the transmission channel, the transmission performance of the packet flow, and the transmission performance of the transmission channel.

That the control device determines the transmission channel (namely, the transmission channel #1) corresponding to the at least one packet flow, in the at least one transmission channel based on the packet sending frequency of the packet flow, the packet sending frequency currently supported by the transmission channel, the transmission performance of the packet flow, and the transmission performance of the transmission channel should meet at least two conditions.

Condition #1: The packet sending frequency currently supported by the transmission channel is greater than or equal to the sum of the packet sending frequencies of the at least one packet flow.

Condition #2: The transmission performance of the transmission channel meets the transmission performance of the at least one packet flow.

For example, in the condition #1, if the sum of the packet sending frequencies of the at least one packet flow is less than or equal to 100 times/second, the packet sending frequency currently supported by the transmission channel determined based on the at least one packet flow is greater than or equal to 100 times/second. In the condition #2, performance of the transmission channel needs to meet the transmission performance of each of the at least one packet flow. For example, if a minimum latency of the at least one packet flow is 2s, a latency of the transmission channel determined based on the at least one packet flow is less than or equal to 2s.

In this way, the control device determines, in the at least one transmission channel based on the condition #1 and the condition #2, the transmission channel #1 that meets the condition.

It should be understood that in this embodiment of this application, the packet sending frequency currently supported by the transmission channel is a remaining packet sending frequency of the transmission channel.

In this embodiment of this application, the control device obtains the parameter of the at least one packet flow in a plurality of manners. This is not limited in this embodiment of this application.

For example, in a session establishment process, the control device may receive the parameter that is of the at least one packet flow and that is sent by the application server.

For another example, a parameter of a packet flow that can be supported by a system may be configured in the control device. In a session establishment process, the control device obtains information used to indicate at least one packet flow of a session. Therefore, the parameter of the at least one packet flow may be determined in the configured parameter of the packet flow based on the information.

For another example, a parameter of a packet flow that can be supported by a system may be configured in another network element (for example, a UDM network element). In a session establishment process, the control device obtains at least one packet flow of a session. Therefore, the control device may obtain the parameter of the at least one packet flow based on the at least one packet flow of the session by interacting with the another network element by using related signaling.

Similarly, the control device may also obtain the parameter of the transmission channel in the at least one transmission channel in a plurality of manners. This is not limited in this embodiment of this application.

For example, the parameter of the at least one transmission channel may be configured in the control device.

For another example, the parameter of the at least one transmission channel may be configured in another network element (for example, a UDM network element), and the control device may obtain the parameter of the at least one transmission channel from the another network element.

It should be understood that although a process in which the transmission channel #1 is determined is used as an example for description, this should not constitute a limitation on this embodiment of this application. During specific implementation, a process in which another transmission channel is determined based on the another packet flow in the packet flow of the session is the same as a process in which the transmission channel #1 is determined based on the at least one packet flow. For brevity, details are not described herein again.

In step S212, the control device sends identification information #1 used to identify the transmission channel #1, to the network device #A.

In this way, the network device #A may determine, based on the identification information #1, a transmission channel that may be used when a packet is sent. Certainly, the packet flow to which the packet that can be transmitted on the transmission channel #1 belongs belongs to the at least one packet flow.

As described above, the transmission channel has two types of identifiers: a first-type identifier of the transmission channel and a second-type identifier of the transmission channel. The identification information #1 herein may be identification information used to indicate the first-type identifier of the transmission channel, or may be identification information used to indicate the second-type identifier of the transmission channel.

It should be noted that when it is determined, based on the packet flow of the session, that there are a plurality of transmission channels, each piece of identification information is used to identify a transmission channel, and a plurality of pieces of identification information used to identify the plurality of transmission channels may be carried in one message. The control device sends the plurality of pieces of identification information to the network device #A by using one message. Alternatively, a plurality of pieces of identification information used to identify the plurality of transmission channels are respectively carried in different information, and the control device sends the plurality of pieces of identification information to the network device #A by sending different information.

The following describes, in detail, a process in which the network device #A sends a packet on the transmission channel #1.

In step S213, the network device #A obtains a first packet (denoted as a packet #1 for ease of differentiation and understanding), and determines packet flows to which a packet flow belongs, where the packet #1 belongs to the packet flow. If the packet flow to which the packet #1 belongs to the at least one packet flow, it indicates that the network device #A may send, by using the transmission channel #1, a second packet (denoted as a packet #2 for ease of differentiation and understanding) generated based on the packet #1. In addition, in step S214, the network device #A sends the packet #2 based on the packet sending frequency of the transmission channel #1 by using the transmission channel #1.

A manner in which the network device #A obtains the packet #1 is first described herein.

During uplink transmission, when the network device #A is the access network device, the network device #A receives the packet #1 sent by a terminal device; or when the network device #A is the UPF network element, the network device #A receives the packet #1 sent by the access network device.

During downlink transmission, when the network device #A is the application server, the network device #A generates the packet #1; or when the network device #A is the UPF network element, the network device #A receives the packet #1 sent by the application server.

In this embodiment of this application, forwarding information that is used to send the packet and that corresponds to the transmission channel in the at least one transmission channel is configured in the network device #A. The transmission channel #1 is used as an example, and the forwarding information of the transmission channel #1 includes at least a packet sending frequency of the transmission channel #1, a label added to the packet and used to identify the transmission channel #1, a queue allocated for forwarding the packet, and a time slice corresponding to the queue. The time slice is a time allocated to the queue for transmitting the packet. In addition, the label used to identify the transmission channel #1 may be the same as or different from content of the identification information #1, provided that the transmission channel #1 can be identified.

In addition, forwarding information of the at least one transmission channel is also configured in a switch configured to forward the packet between the network device #A and the network device #B.

For example, if determining that the packet flow to which the packet #1 belongs belongs to the at least one packet flow, the network device #A determines to send, by using the transmission channel #1, the packet #2 generated based on the packet #1. In this case, the network device #A determines, in the forwarding information of the at least one transmission channel, forwarding information of the transmission channel #1 based on the identification information #1, and determines, in the forwarding information of the transmission channel #1, the packet sending frequency of the transmission channel #1 and the label used to identify the transmission channel #1. Further, the network device #A adds the label used to identify the transmission channel #1, to a to-be-sent packet, to generate the packet #2, and sends the packet #2 based on the packet sending frequency of the transmission channel #1. After receiving the packet #2, the switch configured to forward the packet between the network device #A and the network device #B may determine, based on the label of the transmission channel #1, the forwarding information of the transmission channel #1, determine the queue corresponding to the transmission channel #1, and a time slice used to forward the queue, and forward the packet #2 to the network device #B by using the queue corresponding to the transmission channel #1 and the time slice used to forward the queue.

It should be noted that after obtaining the packet #1, the network device #A needs to decapsulate and encapsulate a protocol stack, to generate the packet #2. To be specific, original data of the packet #1 is the same as original data of the packet #2. Because transmit ends and receive ends of the two packets are different, other information added to the packets is different. The other information may be a header of a general packet radio service tunneling protocol (general packet radio service tunneling protocol, GTP) packet, a header of a user datagram protocol (user datagram protocol, UDP) packet, and a header of an IP packet.

In a mobile network, due to existence of mobility, services transmitted in the mobile network in different time periods may be different, and different bandwidths in the mobile network in the different time periods are caused. Therefore, when the system pre-configures the at least one transmission channel for a transmission network including the first network device and the second network device, the control device needs to determine, in the at least one transmission channel based on a packet flow generated based on a current session, a transmission channel (for example, the first transmission channel) that can transmit a packet that belongs to the packet flow, and send the identification information used to identify the transmission channel, to the first network device, so that the first network device may determine the transmission channel used to transmit the packet.

In this embodiment of this application, a packet sending frequency of the transmission channel (for example, the first transmission channel) determined by the control device in the at least one transmission channel is greater than or equal to the packet sending frequency of the at least one packet flow, and the transmission performance of the first transmission channel meets the transmission performance of the at least one packet flow. In this way, when determining that the packet flow to which the packet belongs to the at least one packet flow, the first network device sends the packet based on the packet sending frequency of the first transmission channel by using the first transmission channel. Because both the time slice used to forward the packet and the queue allocated for forwarding the packet that are in the switch between the first network device and the second network device are configured based on the frequency of the transmission channel, when the first network device sends the packet by using the first transmission channel corresponding to the packet, the time slice used to forward the packet is determined, and a length of the queue allocated for forwarding the packet is limited, so that a transmission delay of the packet may be controlled within a specific range, and transmission requirements of different packets in the mobile network can be met.

Therefore, in the information transmission method in this embodiment of this application, the control device determines, in the at least one transmission channel configured between the first network device and the second network device, the first transmission channel used to transmit the packet that belongs to the at least one packet flow. In addition, by using the identification information used to identify the first transmission channel, the first network device may determine that the first transmission channel can be used to transmit the packet that belongs to the at least one packet flow. The packet sending frequency of the first transmission channel is greater than or equal to the packet sending frequency of the at least one packet flow, and the transmission performance of the first transmission channel meets the transmission performance of the at least one packet flow. Further, when sending the packet that belongs to the at least one packet flow, the first network device sends the packet by using the first transmission channel based on the packet sending frequency of the first transmission channel, so that the transmission delay of the packet can be effectively reduced, and a requirement for transmission performance of the packet in the mobile network can further be met.

In step 213, before sending the packet, the network device #A needs to determine whether a packet flow to which a first packet that is to be sent belongs to the at least one packet flow. The following describes a determining process in step 213 in detail.

Optionally, the method further includes:

sending, by the control device, first indication information to the first network device, where the first indication information is used to indicate the at least one packet flow.

Correspondingly, the first network device receives the first indication information, and determines, based on the first indication information and a field in the first packet, that the packet flow to which the first packet belongs to the at least one packet flow, where the field in the first packet is used to indicate the at least one packet flow.

The field in the packet #1 includes at least one field in the packet #1, and the at least one field is some fields in the packet #1. When there are a plurality of fields in the packet #1, the plurality of fields are jointly used to indicate the at least one packet flow.

For example, the network device #A matches received content of the first indication information with the field in the packet #1. If the first indication information can successfully match the field in the packet #1, it indicates that the packet flow to which the packet #1 belongs belongs to the at least one packet flow. If the first indication information cannot successfully match the field in the packet #1, it indicates that the packet to which the packet #1 belongs does not belong to the at least one packet flow.

It should be understood that whether the matching herein is successful indicates whether the first indication information successfully matches the at least one field in the packet #1.

The following describes a relationship between generation of the indication information and the packet #1.

Before sending the packet, the transmit end (for example, the network device or the terminal device) adds, according to a network protocol, corresponding information to a specified location in the packet (for example, the transmit end device adds, according to the network protocol, an IP address of the application server to a specified location that is of a destination IP address and that is in the packet), to correctly transmit the packet. The control device may generate the first indication information based on information added to the specified location in the packet, that is, combine a plurality of fields that indicate different content and that are in the information, to form the first indication information.

For example, if the information added to the specified location in the packet may include three fields, where a first field is used to indicate a destination address of the packet, a second field is used to indicate a port number, and a third field is used to identify a packet flow identifier of the packet flow to which the packet belongs, the control device may separately use the foregoing three fields as content of the first indication information. To be specific, the first indication information includes any one of the first field, the second field, or the third field. Alternatively, the control device may use content of a combination of every two of the foregoing three fields as content of the first indication information. For example, the first indication information includes the first field and the second field, and the first field and the second field are jointly used to indicate the at least one packet flow. Alternatively, the control device may use the foregoing three fields as the content of the first indication information. To be specific, the first indication information includes the first field, the second field, and the third field, and the three fields are jointly used to indicate the at least one packet flow. In addition, when a plurality of fields are jointly used to indicate the at least one packet flow, the plurality of fields may indicate the at least one packet flow by using a logical expression, for example, (not(field 1=a)) and (field 2=b or field 3=c).

It should be noted that when the control device determines, based on the packet flow of the session, the plurality of transmission channels including the first transmission channel, when sending the plurality of pieces of identification information used to identify the plurality of transmission channels, to the network device #A, the control device may also send the plurality of pieces of indication information to the network device #A. The plurality of pieces of identification information correspond to the plurality of pieces of indication information. The packet flow corresponding to the transmission channel identified by each piece of identification information is the packet flow indicated by corresponding indication information. In this way, the network device #A determines, by using one piece of indication information (for example, the first indication information), that the packet flow to which the to-be-sent packet belongs to the packet flow indicated by the first indication information, and may send the packet by using the transmission channel identified by the identification information corresponding to the first indication information.

By way of example, and not limitation, the network device #A may not only determine, based on the received first indication information and the field of the packet #1, that the packet flow to which the packet #1 belongs to the at least one packet flow. Alternatively, another manner may be used to determine that the packet flow to which the packet #1 belongs to the at least one packet flow. For example, the system may pre-configure the plurality of pieces of indication information based on a combination manner of packet flows. Each piece of indication information is used to indicate one packet flow group. The packet flow group includes at least one packet flow, and the plurality of pieces of indication information are stored in the network device #A. In this way, before sending the packet, the network device #A performs matching between the packet and all pieces of indication information one by one. If the packet successfully matches one piece of indication information (for example, the first indication information), it indicates that the packet flow to which the packet belongs to the at least one packet flow indicated by the first indication information, and then the packet is sent by using a corresponding transmission channel.

In this embodiment of this application, there is no transmission channel between the terminal device and the network device, the packet is transmitted between the terminal device and the network device by using an air interface, and the terminal device needs to send the packet based on the packet sending frequency of the packet flow to which the packet belongs. If the terminal device does not send the packet based on the packet sending frequency of the packet flow to which the packet belongs, a requirement of another packet flow on transmission performance may be affected.

Therefore, an optional manner is further provided in this embodiment of this application, and the optional manner continues to be shown in FIG. 2.

In step S221, the control device sends frequency information of a first packet flow (denoted as frequency information #1 of the packet flow for ease of differentiation and understanding) to the terminal device. The frequency information #1 of the packet flow is used to indicate a packet sending frequency of each of the at least one packet flow, and the terminal device further receives the frequency information #1 of the packet flow.

In step S222, the terminal device determines, in the frequency information #1 of the packet flow based on the packet flow to which the to-be-sent packet belongs, the packet sending frequency of the packet flow to which the packet belongs, where the packet flow belongs to the at least one packet flow.

In step S223, the terminal device sends the packet based on the packet sending frequency of the packet flow to which the packet belongs.

For example, the control device may obtain the packet sending frequency of the at least one packet flow by using the manner described above, and send the frequency information #1 that is of the packet flow and that is used to indicate the packet sending frequency of each of the at least one packet flow, to the terminal device, so that the terminal device may send the packet by using the packet sending frequency of the packet flow to which the packet belongs.

It should be understood that when the network device #A is the access network device, the packet #1 obtained by the access network device is the packet sent by the terminal device.

Therefore, in the information transmission method provided in this embodiment of this application, the control device sends the frequency information that is of the first packet flow and that is used to indicate the packet sending frequency of each of the at least one packet flow, to the terminal device, so that the terminal device may send the packet by using the packet sending frequency corresponding to the packet flow to which the packet belongs. Therefore, a problem in which transmission performance of a packet of another packet flow is affected may be effectively avoided because the terminal device sends the packet based on the packet sending frequency of the packet flow.

By way of example, and not limitation, for a manner in which the terminal device determines the packet sending frequency of the packet flow to which the packet belongs, the foregoing manner in which the terminal device determines the packet sending frequency of the packet flow based on the frequency information of the first packet flow is merely described as an example. This embodiment of this application is not limited thereto. For example, the packet sending frequency of the packet flow is configured in the terminal device side. Before sending the packet, the terminal device determines the packet sending frequency of the packet flow to which the packet belongs, based on the packet flow to which the packet belongs, in the packet sending frequency that is of the packet flow and that is configured in the terminal device.

In the mobile network, due to existence of mobility, packet sending frequencies supported by each transmission channel in different time periods may be different. Therefore, the network device needs to update the packet sending frequency of each transmission channel in real time. In view of this, two optional implementations are further provided in this embodiment of this application. In an optional implementation, a third network device updates the packet sending frequency of the transmission channel. In another optional implementation, the control device updates the packet sending frequency of the transmission channel. The following separately describes the two optional implementations.

Manner A (the third network device updates the packet sending frequency of the transmission channel)

In step S231, the control device sends second identification information (denoted as identification information #2 for ease of differentiation and understanding) and frequency information of a second packet flow (denoted as frequency information #2 of the packet flow for ease of differentiation and understanding) to the third network device (denoted as a network device #C for ease of differentiation and understanding). The identification information #2 is used to identify the transmission channel #1, and the frequency information #2 of the packet flow is used to indicate the packet sending frequency of each of the at least one packet flow or the sum of the packet sending frequencies of the at least one packet flow, and the network device #C receives the identification information #2 and the frequency information #2 of the packet flow.

The identification information #2 is identification information used to uniquely identify the transmission channel #1, namely, the first-type identifier of the transmission channel.

Optionally, the network device #C is the UDM network element.

In step S232, the network device #C determines the frequency information of the first transmission channel (denoted as frequency information #1 of the transmission channel for ease of differentiation and understanding) based on the identification information #2, where the frequency information #1 of the transmission channel is used to indicate a packet sending frequency currently supported by the transmission channel #1.

For example, if transmission channel information of a transmission channel configured in each transmission network in the entire mobile network is configured in the network device #C, and transmission channel information of each transmission channel includes the frequency information that is of the transmission channel and that is used to indicate the packet sending frequency of the transmission channel, the network device #C determines transmission channel information of the transmission channel #1 in the transmission channel information based on the identification information #2, and then determines the frequency information #1 of the transmission channel in the transmission channel information of the transmission channel #1.

In step S233, the network device #C generates updated frequency information #1 of the transmission channel based on the frequency information #1 of the transmission channel and the frequency information #2 of the packet flow.

The network device #C may update the frequency information #1 of the transmission channel based on two cases. Details are described as follows.

Case 1 (a packet sending frequency is reserved for the at least one packet flow)

In case 1, the network device #C needs to reserve, for the at least one packet flow, a packet sending frequency of the at least one packet flow from the packet sending frequency of the transmission channel #1.

For example, after the control device selects the transmission channel #1 for the at least one packet flow, to ensure correct transmission of a packet in the at least one packet flow and subsequent correct transmission of a packet in another packet flow, the network device #C subtracts a packet sending frequency that is occupied by the at least one packet flow and that is in the transmission channel #1. A remaining packet sending frequency of the transmission channel #1 is used to select a transmission channel for the another packet flow. To be specific, the control device determines, based on a packet sending frequency in the updated frequency information #1 of the transmission channel, whether the packet in the another packet flow may be sent by using the transmission channel #1.

The network device #C updates the frequency information #1 of the transmission channel based on two manners.

Manner A1

When the frequency information #2 of the packet flow is used to indicate the packet sending frequency of each of the at least one packet flow, the network device #C subtracts the packet sending frequency of each packet flow from the packet sending frequency currently supported by the transmission channel #1, to generate the updated frequency information #1 of the transmission channel.

Manner A2

When the frequency information #2 of the packet flow is used to indicate the sum of the packet sending frequencies of the at least one packet flow, the control device subtracts the sum of the packet sending frequencies of the at least one packet flow from the packet sending frequency currently supported by the transmission channel #1, to generate the updated frequency information of the transmission channel.

A difference between manner A2 and manner A1 lies in that in manner A2, the frequency information #2 of the packet flow indicates a sum of packet sending frequencies of all packet flows in the at least one packet flow. In this way, the network device #C may directly subtract the sum of the packet sending frequencies of all packet flows in the at least one packet flow from the packet sending frequency currently supported by the transmission channel #1. However, in manner A1, the frequency information #2 of the packet flow indicates the packet sending frequency of each of the at least one packet flow. The network device #C needs to subtract the sending frequency of each packet flow from the packet sending frequency currently supported by the transmission channel #1, or subtract a sum that is of the packet sending frequencies and that is generated by the network device #C based on the packet sending frequency of each of the at least one packet flow.

The network device #C may determine, based on a type of the received information, case 1 herein, to be specific, whether the network device #C needs to reserve the packet sending frequency for the at least one packet flow. For example, in a session process, the frequency information #2 of the packet flow and the identification information #2 may be carried in request information of the transmission channel. In this way, the network device #C may determine, based on an information type of the request information of the transmission channel, that a resource needs to be reserved for the at least one packet flow. For specific content, refer to the following description about step 308 in the method 300.

Case 2 (the packet sending frequency of the at least one packet flow is released)

In case 2, the network device #C needs to add the packet sending frequency of each of the at least one packet flow to the packet sending frequency of the transmission channel #1. In this way, the control device determines, based on the packet sending frequency in the updated frequency information #1 of the transmission channel, whether the packet in the another packet flow may be sent by using the transmission channel #1.

It should be noted that in this case, the packet sending frequency in the frequency information #1 that is of the transmission channel and that is determined based on the identification information #1 is updated packet sending frequency of the transmission channel in case 1.

Similarly, the network device #C updates the frequency information #1 of the transmission channel based on two manners:

Manner A3

When the frequency information #2 of the packet flow is used to indicate the packet sending frequency of each of the at least one packet flow, the network device #C adds the packet sending frequency of each packet flow to the packet sending frequency currently supported by the transmission channel #1, to generate the updated frequency information #1 of the transmission channel.

Manner A4

When the frequency information #2 of the packet flow is used to indicate the sum of the packet sending frequencies of the at least one packet flow, the control device adds the sum of the packet sending frequencies of the at least one packet flow to the packet sending frequency currently supported by the transmission channel #1, to generate the updated frequency information #1 of the transmission channel.

Similarly, the network device #C may determine, based on the type of the received information, whether the packet sending frequency of the at least one packet flow needs to be released. For example, in a session end process, the frequency information #2 of the packet flow and the identification information #2 may be carried in release information of the transmission channel. In this way, the network device #C may determine, based on an information type of the release information of the transmission channel, that the packet sending frequency of the at least one packet flow needs to be released.

In this way, when the control device needs to subsequently determine, based on information about all transmission channels, a corresponding transmission channel for a packet flow of another session, the network device #C may send the updated frequency information that is of the transmission channel and that is in the transmission channel information, to the control device, thereby providing real and valid data for selecting a transmission channel for the packet flow of the another session.

Manner B (the control device may alternatively update the frequency information of the transmission channel)

In another optional implementation, the control device may alternatively update the frequency information of the transmission channel.

Optionally, the method further includes:

determining, by the control device, the frequency information of the first transmission channel based on the first transmission channel, where the frequency information of the first transmission channel is used to indicate the packet sending frequency currently supported by the first transmission channel;

obtaining, by the control device, frequency information of a second packet flow, where the frequency information of the second packet flow is used to indicate the packet sending frequency of each of the at least one packet flow or indicate the sum of the packet sending frequencies of the at least one packet flow; and generating, by the control device, updated frequency information of the first transmission channel based on the frequency information of the first transmission channel and the frequency information of the second packet flow.

Optionally, the generating, by the control device, updated frequency information of the first transmission channel based on the frequency information of the first transmission channel and the frequency information of the second packet flow includes:

subtracting, by the control device when the frequency information of the second packet flow is used to indicate the packet sending frequency of each of the at least one packet flow, the packet sending frequency of each packet flow from the packet sending frequency currently supported by the first transmission channel, to generate the updated frequency information of the first transmission channel;

adding, by the control device when the frequency information of the second packet flow is used to indicate the packet sending frequency of each of the at least one packet flow, a packet sending frequency corresponding to each packet flow to the packet sending frequency currently supported by the first transmission channel, to generate the updated frequency information of the first transmission channel;

subtracting, by the control device when the frequency information of the second packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or adding, by the control device when the frequency information of the second packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel. A specific process in which the control device updates the frequency information #1 of the transmission channel is the same as the foregoing specific process in which the network device #C updates the frequency information #1 of the transmission channel. Details are not described herein again.

It should be noted herein that the control device may determine, based on specific content of the current step, whether to reserve the packet sending frequency for the at least one packet flow or release the packet sending frequency of the at least one packet flow. For example, in the session process, after determining the transmission channel for the network device #A, the control device may reserve the packet sending frequency for the at least one packet flow. For another example, after the session ends, the control device and the UDM network element release the session. In this case, the control device determines that the network device #A has completed the session, and the control device may release the packet sending frequency of the at least one packet flow in or after a session release procedure.

Therefore, in the information transmission method in this embodiment of this application, the control device sends the second identification information and the frequency information of the second packet flow to the third network device, so that the third network device may update the packet sending frequency of the first transmission channel based on the second identification information and the frequency information of the second packet flow in real time. In this way, a packet sending frequency that can be currently supported by the first transmission channel can be accurately reflected, and real and valid data is provided for another packet flow to select a transmission channel, thereby ensuring normal transmission of the packet in all packet flows as much as possible.

It should be noted that in this embodiment of this application, the foregoing describes the information transmission method by using only one transmission channel as an example. However, this should not constitute any limitation on this embodiment of this application. A process in which the control device generates and transmits information (for example, the first identification information, the first indication information, and the second identification information) related to each of the plurality of transmission channels may be the same as a process in which the control device generates and transmits the information related to the first transmission channel. In addition, information related to the plurality of transmission channels may be carried in a same message, or may be respectively carried in a plurality of messages.

With reference to FIG. 2, the foregoing describes this embodiment of this application in detail from a perspective of interaction between the control device and the network device #A, and between the terminal device and the network device #C. The following separately describes a specific procedure in a specific scenario in the embodiments of this application in detail with reference to FIG. 3 to FIG. 6.

Figure 3:
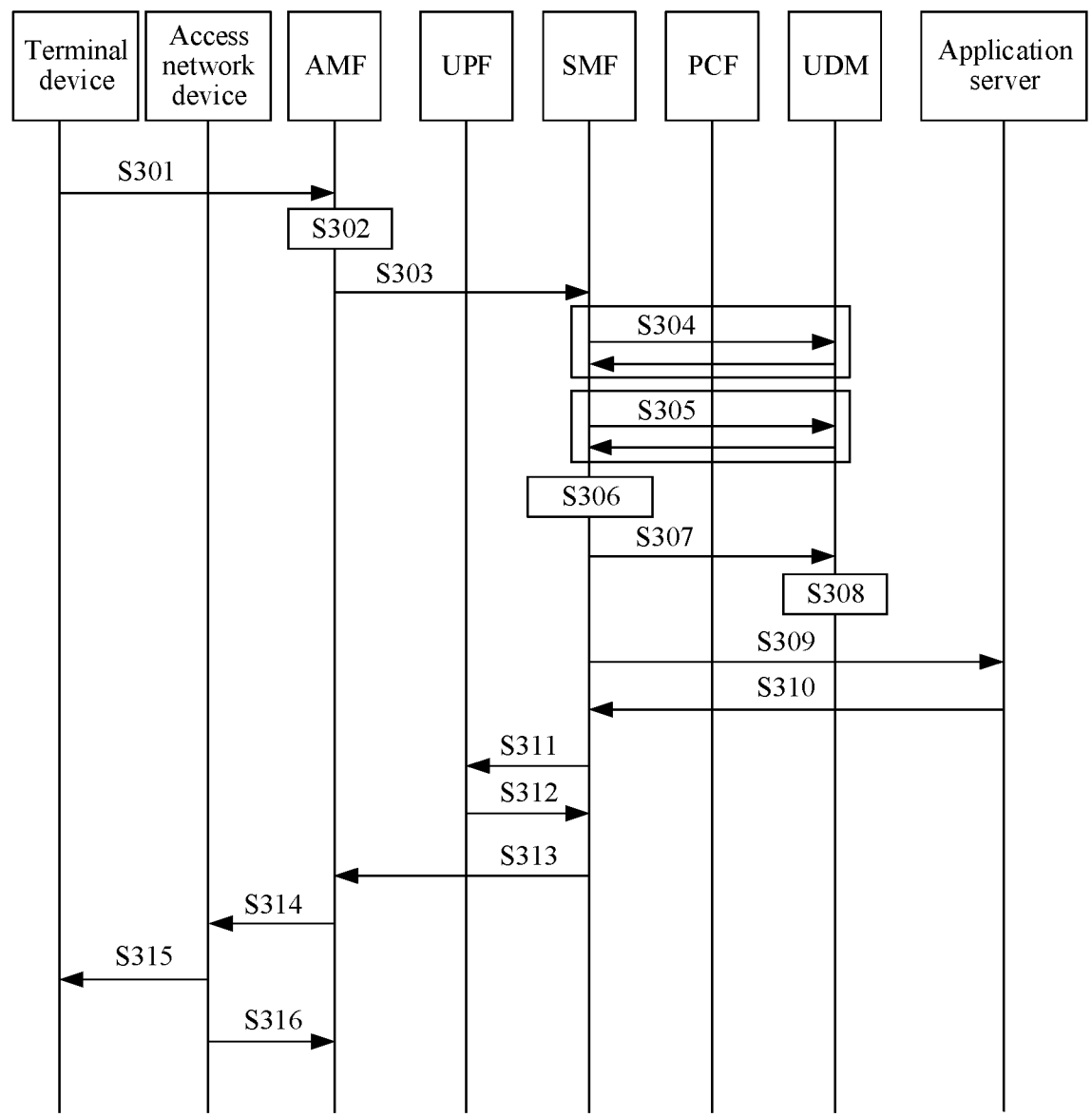
FIG. 3 is a schematic flowchart of an information transmission method according to an embodiment of this application.

FIG. 3 is a schematic flowchart of an information transmission method 300 according to an embodiment of this application. In the method 300, a process of transmitting information between network elements in a session establishment scenario is described by using an example in which an SMF network element is used as a control device, any one of an access network device, a UPF network element, or an application server is used as a network device #A, and a UDM network element is used as a network device #C.

In addition, in the method 300, the network architecture further includes an AMF network element, a policy control function (policy control function, PCF) network element, and the UDM network element. A transmission network between the access network device and the UPF network element is denoted as a transmission network #A, and a transmission network between the UPF network element and the application server is denoted as a transmission network #B.

S301: A terminal device initiates a packet data unit (packet data unit, PDU) session establishment request to an AMF network element.

Optionally, a message used to indicate the session establishment request includes a parameter of a packet flow corresponding to a session.

S302: The AMF network element selects an appropriate SMF network element.

S303: The AMF network element sends a Nsmf PDU session establishment session management request (Nsmf_PDU_session_create SM (session manage) request)

message to the SMF network element, where the message includes information used to create a PDU session.

S304: The SMF obtains subscription data, where the subscription data includes the parameter of the packet flow corresponding to the session.

For example, the SMF network element sends a Nudm subscription data obtaining request (Nudm subscriber data get request) message to the UDM network element, where the message is used to request subscription data of the terminal device in a specific server (for example, the application server). In addition, the UDM network element sends a Nudm subscription data obtaining response (Nudm subscriber data get response) message to the SMF network element, and sends, by using the message, corresponding subscription data to the SMF network element.

Optionally, the subscription data may further include information such as an authorized PDU type and an authorized session and service continuity (session and service continuity, SSC) mode.

S305: The SMF network element obtains, from the UDM network element, transmission channel information of all transmission channels pre-configured by a system for a transmission network #A and a transmission network #B.

For example, the SMF network element sends request information used to request transmission channel information, to the UDM network element, and the UDM sends the transmission channel information to the SMF.

The transmission channel information includes a related parameter of each transmission channel. For a specific description of the parameter of each transmission channel, refer to the foregoing descriptions. Details are not described herein again.

By way of example, and not limitation, in step S304, the subscription data may also include the transmission channel information. To be specific, the SMF network element may also obtain the transmission channel information from the subscription data. This is not limited in this embodiment of this application.

S306: The SMF network element determines, in all transmission channels pre-configured in the transmission network #A for the packet flow of the session, at least one transmission channel (denoted as a group #A of transmission channels for ease of differentiation and understanding) of the packet flow corresponding to the session, and determines, in all transmission channels pre-configured in the transmission network #B, at least one transmission channel (denoted as a group #B of transmission channels for ease of differentiation and understanding) of the packet flow corresponding to the session.

For a process in which the SMF network element determines, based on the packet flow of the session, the corresponding transmission channel in each transmission network, refer to the foregoing process of determining the transmission channel #1 based on the at least one packet flow. Details are not described herein again.

For example, the packet flow of the session includes three packet flows, a packet flow #1 and a packet flow #2 are uplink packet flows, and a packet flow #3 is a downlink packet flow. A transmission channel used for uplink transmission is determined for the packet flow #1 and the packet flow #2 and a transmission channel used for downlink transmission is determined for the packet flow #3, respectively in different transmission networks. In the transmission network #A, two transmission channels are determined for the three packet flows, and the two transmission channels are respectively denoted as an uplink transmission channel #A1 and a downlink transmission channel #A2. The uplink transmission channel #A1 is used to transmit packets that belong to the packet flow #1 and the packet flow #2, and the downlink transmission channel #A2 is used to transmit a packet that belongs to the packet flow #3. In the transmission network #B, two transmission channels are also determined for the three packet flows, and the two transmission channels are respectively denoted as an uplink transmission channel #B1 and a downlink transmission channel #B2. The uplink transmission channel #B1 is used to transmit packets that belong to the packet flow #1 and the packet flow #2, and the downlink transmission channel #B2 is used to transmit a packet that belongs to the packet flow #3.

S307: The SMF network element sends a request message of the transmission channel to the UDM network element.

The request message of the transmission channel includes a packet sending frequency of each packet flow of the session in each transmission network and an identifier of a transmission channel corresponding to each packet flow.

The foregoing example is still used for description. The request information of the transmission channel includes packet sending frequencies of the three packet flows in the transmission network #A, an identifier of a corresponding uplink transmission channel #A1, and an identifier of a corresponding downlink transmission channel #A2. In addition, the request information of the transmission channel includes packet sending frequencies of the three packet flows in the transmission network #B, an identifier of a corresponding uplink transmission channel #B1, and an identifier of a corresponding uplink transmission channel #B2.

S308: The UDM network element determines, based on the identifier of the transmission channel, a packet sending frequency currently supported by each transmission channel, and subtracts a packet sending frequency of a corresponding packet flow from the packet sending frequency of each transmission channel, to generate updated frequency information of the transmission channel.

When the SMF network element subsequently sends the request information used to request the transmission channel information, to the UDM network element, the transmission channel information sent by the UDM network element includes the updated frequency information of the transmission channel.

For steps S307 and S308, refer to the descriptions of S231 to S233 in FIG. 2. Details are not described herein again.

S309: The SMF network element sends at least one piece of identification information used to identify the transmission channel in the transmission network #B and at least one piece of corresponding indication information, to the application server.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

The foregoing example is still used for description. In the transmission network #B, the application server is a transmit end of downlink transmission. Therefore, the at least one piece of identification information includes only identification information (denoted as identification information #B2 of the downlink transmission channel for ease of differentiation and understanding) used to identify the downlink transmission channel #B2. Correspondingly, the at least one piece of indication information includes indication information (denoted as indication information #B2 for ease of differentiation and understanding) corresponding to the identification information #B2 of the downlink transmission channel.

Therefore, the application server may send the packet based on the identification information #B2 of the downlink transmission channel and the indication information #B2. For a specific packet sending process, refer to the foregoing process in which the network device #A sends the packet based on the first indication information and the first identification information. Details are not described herein again.

S310: The application server sends an acknowledgment message to the SMF network element, where the acknowledgment message indicates that the application server successfully receives the at least one piece of identification information and the at least one piece of corresponding indication information that are sent by the SMF network element in step S309.

S311: The SMF network element sends at least one piece of identification information used to identify a transmission channel in the transmission network #A and at least one piece of corresponding indication information, and the at least one piece of identification information used to identify the transmission channel in the transmission network #B and the at least one piece of corresponding indication information, to the UPF network element.

For example, the SMF network element may send an N4 session establishment/modification request (N4 session establishment/modification request) message. The message includes the at least one piece of identification information used to identify the transmission channel in the transmission network #A and the transmission network #B and the at least one piece of corresponding indication information.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

The foregoing example is still used for description. In the transmission network #A, the UPF network element is a transmit end of downlink transmission. In the transmission network #B, the UPF network element is a transmit end of uplink transmission. Therefore, for the UPF network element, the at least one piece of identification information includes identification information (denoted as identification information #A2 of the downlink transmission channel for ease of differentiation and understanding) used to identify the downlink transmission channel #A2 and identification information (denoted as identification information #B1 of the uplink transmission channel for ease of differentiation and understanding) used to identify the uplink transmission channel #B1. Correspondingly, the at least one piece of indication information includes indication information (denoted as indication information #A2 for ease of differentiation and understanding) corresponding to the identification information #A2 of the downlink transmission channel and indication information (denoted as indication information #B1 for ease of differentiation and understanding) corresponding to the identification information #B1 of the uplink transmission channel.

S312: The UPF network element sends the acknowledgment message to the SMF network element, where the acknowledgment message indicates that the UPF network element successfully receives the at least one piece of identification information and the at least one piece of corresponding indication information that are sent by the SMF network element in step S311.

For example, when the at least one piece of identification information used to identify the transmission channel in the transmission network #A and the transmission network #B and the at least one piece of corresponding indication information that are in step S311 are carried in the N4 session establishment/modification request message, the acknowledgment message may be an N4 session establishment/modification response (N4 session establishment/modification response) message.

S313: The SMF network element sends frequency information of a packet flow, the at least one piece of identification information used to identify the transmission channel in the transmission network #A, and the at least one piece of corresponding indication information, to the AMF network element.

For example, the SMF network element may send a Nsmf PDU session establishment context response (Nsmf_PDU_session_create SM context response) message. The message includes the frequency information of the packet flow, the at least one piece of identification information used to identify the transmission channel in the transmission network #A, and the at least one piece of corresponding indication information.

The frequency information of the packet flow is used to indicate a packet sending frequency of each of all packet flows of the session, each piece of identification information is used to identify the transmission channel, and each piece of indication information is used to indicate at least one packet flow to which the packet flow belongs, where the packet transmitted on the corresponding transmission channel belongs to the packet flow. For specific descriptions of the frequency information of the packet flow, the identification information, and the corresponding indication information, refer to the foregoing descriptions of the frequency information of the first packet flow, the first identification information, and the first indication information. Details are not described herein again.

S314: The AMF network element sends the frequency information of the packet flow, the at least one piece of identification information, and the at least one piece of corresponding indication information that are received by the AMF in step S313, to the access network device.

To be specific, the AMF network element forwards or transparently transmits the frequency information of the packet flow, the at least one piece of identification information, and the at least one piece of corresponding indication information that are received in step S313.

For example, the AMF network element may send an N2 PDU session request (N2 PDU session request) message, and the message includes the frequency information of the packet flow, the at least one piece of identification information, and the at least one piece of corresponding indication information.

The foregoing example is still used for description. Because the at least one piece of identification information and the at least one piece of identification information are information finally sent to the access network device, and in the transmission network #A, the access network device is a transmit end of uplink transmission, the at least one piece of identification information includes only identification information (denoted as identification information #A1 of the uplink transmission channel for ease of differentiation and understanding) used to identify the uplink transmission channel #A1. Correspondingly, the at least one piece of indication information includes indication information (denoted as indication information #A1 for ease of differentiation and understanding) corresponding to the identification information #A1 of the uplink transmission channel.

Therefore, the access network device may send the packet based on the identification information #A1 of the uplink transmission channel and the indication information #A1. For a specific packet sending process, refer to the foregoing process in which the network device #A sends the packet based on the first indication information and the first identification information. Details are not described herein again.

S315: The access network device sends the frequency information of the packet flow to the terminal device.

For example, the access network device may send anon-access stratum (Non access stratum, NAS) message, and the NAS message includes the frequency information of the packet flow.

Subsequently, the terminal device may send the packet based on the frequency information of the packet flow. For a specific process, refer to the foregoing process in which the terminal device sends the packet based on the frequency information of the first packet flow. Details are not described herein again.

S316: The access network device sends an N2 PDU session response (N2 PDU session response) message to the AMF network element.

It should be understood that sequence numbers of steps S309, S311, S313, and S315 do not mean an execution sequence. The execution sequence of the steps should be determined based on functions and internal logic of the steps. For example, steps S309, S311, S313, and S315 may be performed at the same time.

Figure 4:
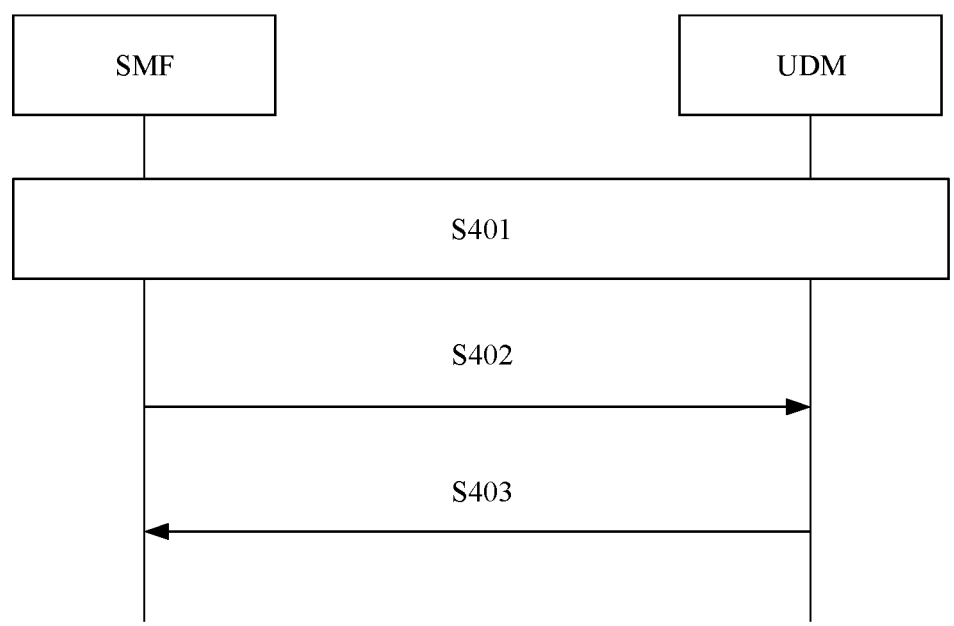
FIG. 4 is a schematic flowchart of an information transmission method according to another embodiment of this application.

FIG. 4 is a schematic flowchart of an information transmission method 400 according to another embodiment of this application. In the method 400, a process of transmitting information between a control device and a network device #C in a scenario in which a session is released after the session ends is described by using an example in which an SMF network element is used as the control device and a UDM network element is used as a network device #C. A session release process may be a process of releasing a session established in the method 400.

S401: A plurality of network elements including the SMF network element and the UDM network element complete a session release process.

S402: The SMF network element sends a release message of a transmission channel to the UDM network element, where the message includes a packet sending frequency of each packet flow of a session in each transmission network and an identifier of a transmission channel corresponding to each packet flow.

An example of the transmission channel in the transmission channel #A and the transmission channel #B in the method 300 is still used. The release information of the transmission channel includes packet sending frequencies of three packet flows in the transmission network #A, an identifier of a corresponding uplink transmission channel #A1, and an identifier of a corresponding downlink transmission channel #A2. In addition, request information of the transmission channel includes packet sending frequencies of three packet flows in the transmission network #B, an identifier of a corresponding uplink transmission channel #B1, and an identifier of a corresponding uplink transmission channel #B2.

The UDM network element determines, based on the identifier of the transmission channel, a packet sending frequency currently supported by each transmission channel, and adds a packet sending frequency of a corresponding packet flow to a packet sending frequency of each transmission channel, to generate updated frequency information of the transmission channel.

For step S402, refer to the description of step S233 in FIG. 2. Details are not described herein again.

S403: The UDM network element sends an acknowledgment message to the SMF network element, where the acknowledgment message is used to indicate that the UDM network element successfully releases a packet sending frequency occupied in each transmission channel.

Figure 5:
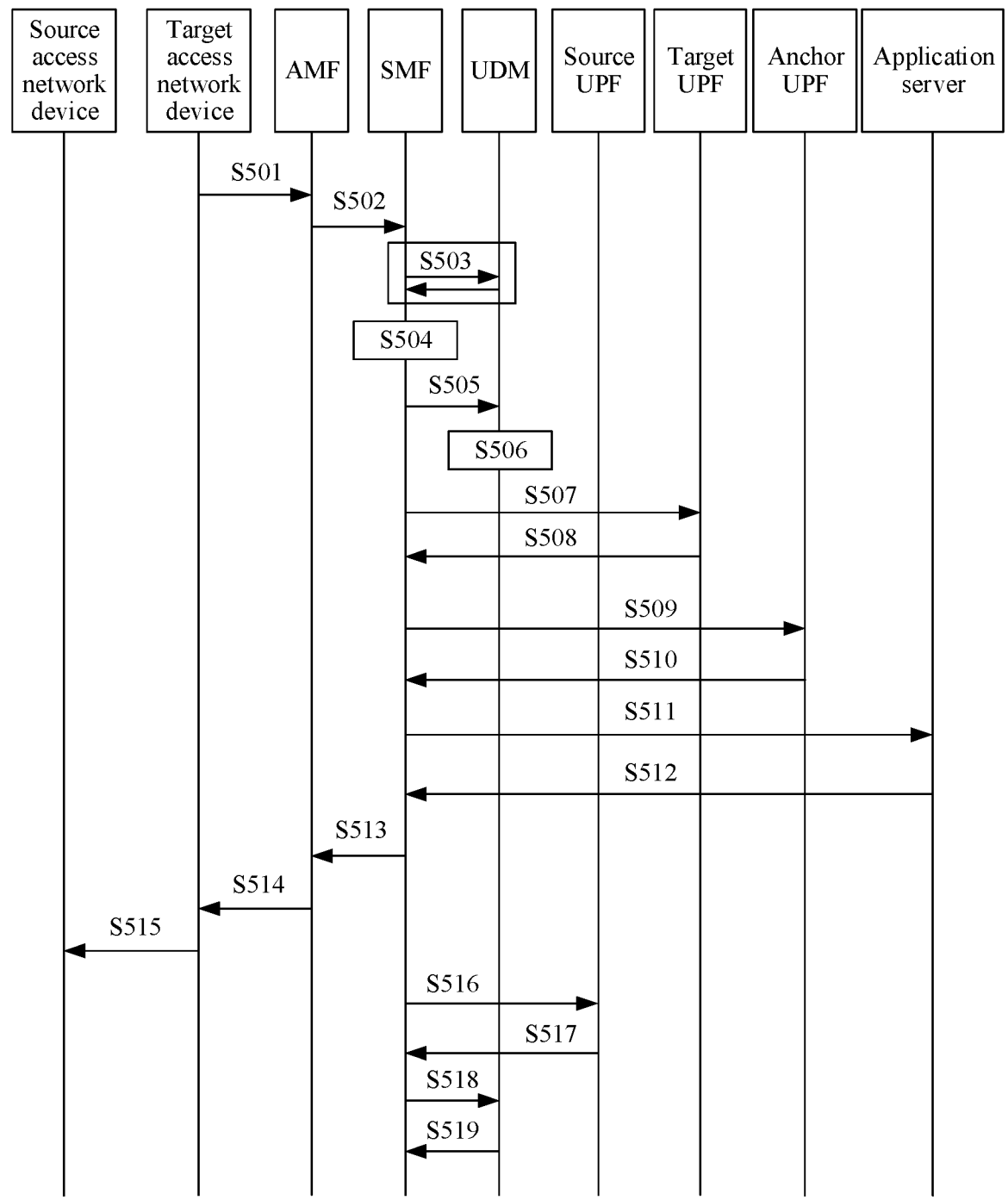
FIG. 5 is a schematic flowchart of an information transmission method according to another embodiment of this application.

FIG. 5 is a schematic flowchart of an information transmission method 500 according to another embodiment of this application. In the method 500, a process of transmitting information between network elements in a scenario in which a UPF network element is reselected in a process in which an access network device is switched is described by using an example in which an SMF network element is used as a control device, any one of the access network device, the UPF network element, or an application server is used as a network device #A, and a UDM network element is used as a network device #C.

In the method, a network architecture further includes an AMF network element and the UDM network element. The UPF network element includes a source UPF network element, a target UPF network element, and an anchor UPF network element. The access network device includes a source access network device and a target access network device. In a scenario of reselecting the UPF network element, a transmission path of a packet before the UPF network element is switched is: a terminal device→the access network device→the source UPF network element→the anchor UPF network element; and a transmission path of a packet after the UPF network element is switched is: the terminal device→the access network device→the target UPF network element→the anchor UPF network element.

Herein, a transmission network between the target access network device and the target UPF network element is denoted as a transmission network #C1, a transmission network between the target UPF network element and the anchor UPF network element is denoted as a transmission network #C2, and a transmission network between the anchor UPF network element and the application server is denoted as a transmission network #C3.

S501: A target access network device sends an N2 path switch request (N2 path switch request) message to an AMF network element, where the N2 path switch request message is used to notify that a terminal device has moved to a new cell and at least one PDU session that needs to be switched.

S502: The AMF network element sends session management information (N2 SM information) to an SMF network element, where the information includes an ID of a PDU session corresponding to the SMF network element, a parameter of a corresponding packet flow, N3 tunnel information, and the like. It should be noted that if there are a plurality of SMF network elements related to a plurality of PDU sessions that need to be switched in S501, the AMF network element further sends an N2 SM information message to an SMF network element other than the SMF network element shown in FIG. 5. One SMF network element corresponds to at least one session.

In addition, all steps and information related to another SMF are similar to the steps and information that are related to the SMF and that are in the method 500. Therefore, in this embodiment of this application, only one SMF is used as an example for description, and a session that is in the at least one session and that corresponds to the SMF shown in FIG. 5 is denoted as a session #1.

S503: The SMF network element obtains, from a UDM network element, transmission channel information of transmission channels pre-configured by a system for the transmission network #C1, the transmission network #C2, and the transmission network #C3.

For example, the SMF network element sends request information used to request the information about the transmission channel, to the UDM network element, and the UDM sends the information about the transmission channel to the SMF.

The information about the transmission channel includes a related parameter of each transmission channel. For a specific description of the parameter of each transmission channel, refer to the foregoing descriptions. Details are not described herein again.

S504: The SMF network element selects a target UPF network element.

For example, for a to-be-switched session #1, the SMF network element needs to determine whether a current UPF network element (namely, the source UPF network element) can meet a requirement of a packet flow corresponding to the session #1. A specific determining condition includes at least the following: When the UPF is not changed, whether the transmission channel between the source UPF network element and the anchor UPF network element and the transmission channel between the anchor UPF network element and the application server can meet a performance requirement of the packet flow. If determining that the current UPF network element does not meet the foregoing determining condition, and the SMF network element needs to switch from the current UPF network element (namely, the source UPF network element) to the target UPF network element, the SMF network element selects a transmission channel between the target access network device and the target UPF network element, a transmission channel between the target UPF network element and the anchor UPF network element, and a transmission channel between the anchor UPF network element and the application server.

Herein, the transmission channel between the source UPF network element and the anchor UPF network element and the transmission channel between the anchor UPF network element and the application server may be a transmission channel that has been selected by the SMF for the packet flow, or may be a pre-configured transmission channel.

By way of example, and not limitation, when determining whether the transmission channel meets the performance requirement of the packet flow, whether the transmission channel that has been selected by the SMF network element for the packet flow meets the performance requirement of the packet flow may be first determined. If the transmission channel does not meet the performance requirement of the packet flow, whether another transmission channel pre-configured between the UPF network element and the application server meets the performance requirement of the packet flow is then determined.

For a manner in which the SMF network element determines whether the transmission channel meets the performance requirement of the packet flow (or the manner in which the SMF network element selects the transmission channel for the packet flow), refer to the foregoing related descriptions. Details are not described herein again.

S505: The SMF network element sends a request message of the transmission channel to the UDM network element.

The request message of the transmission channel includes a packet sending frequency of each packet flow of the session in each transmission network and an identifier of a transmission channel corresponding to each packet flow.

It should be noted that in a process of switching the access network device and reselecting the UPF network element, a new transmission channel is added in step S604. In this way, the request message of the transmission channel may include only an identifier of the newly added transmission channel.

S506: The UDM network element determines, based on the identifier of the transmission channel, a packet sending frequency currently supported by each transmission channel, and subtracts a packet sending frequency of a corresponding packet flow from the packet sending frequency of each transmission channel, to generate updated frequency information of the transmission channel.

When the SMF subsequently sends the request information used to request the information about the transmission channel, to the UDM network element, the information that is about the transmission channel and that is sent by the UDM network element includes the updated frequency information of the transmission channel.

S507: The SMF network element sends at least one piece of identification information used to identify a transmission channel in the transmission network #C1 and the transmission network #C2 and at least one piece of corresponding indication information, to the target UPF network element.

For example, the SMF network element may send an N4 session establishment/modification request (N4 session establishment/modification request) message. The message includes the at least one piece of identification information used to identify the transmission channel in the transmission network #C1 and the transmission network #C2 and the at least one piece of corresponding indication information.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

It should be noted that in the transmission network #C1, the target UPF network element is a transmit end of downlink transmission, and in the transmission network #C2, the target UPF network element is a transmit end of uplink transmission. The transmission channel identified by the at least one piece of identification information includes both an uplink transmission channel used for uplink transmission and a downlink transmission channel used for downlink transmission. For specific descriptions, refer to related descriptions of step S311 in the method 300.

S508: The target UPF network element sends an acknowledgment message to the SMF network element, and the SMF network element enables a timer that is to be used in a subsequent step S516. The acknowledgment message indicates that the target UPF network element successfully receives the at least one piece of identification information and the at least one piece of corresponding indication information that are sent by the SMF network element in step 507.

For example, when the at least one piece of identification information used to identify the transmission channel in the transmission network #C1 and the transmission network #C2 and the at least one piece of corresponding indication information are carried in the N4 session establishment/modification request message, the acknowledgment message may be an N4 session establishment/modification response (N4 session establishment/modification response) message.

S509: The SMF network element sends at least one piece of identification information used to identify a transmission channel in the transmission network #C2 and/or the transmission network #C3 and the at least one piece of corresponding indication information, to the anchor UPF network element.

For example, the SMF network element may send an N4 session modification request (N4 session modification request) message. The message includes the at least one piece of identification information used to identify the transmission channel in the transmission network #C2 and/or the transmission network #C3 and the at least one piece of corresponding indication information.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

It should be noted that in the transmission network #C2, the anchor UPF network element is a transmit end of downlink transmission, and in the transmission network #C3, the anchor UPF network element is a transmit end of uplink transmission. The transmission channel identified by the at least one piece of identification information may include both an uplink transmission channel used for uplink transmission and a downlink transmission channel used for downlink transmission. For specific descriptions, refer to related descriptions of step S311 in the method 300.

S510: The anchor UPF network element sends the acknowledgment message to the SMF network element, where the acknowledgment message indicates that the anchor UPF network element successfully receives the at least one piece of identification information and the at least one piece of corresponding indication information that are sent by the SMF network element in step S509.

For example, when the at least one piece of identification information used to identify the transmission channel in the transmission network #C2 and/or the transmission network #C3 and the at least one piece of corresponding indication information are carried in the N4 session modification request message, the acknowledgment message may be an N4 session modification response (N4 session modification response) message.

S511: The SMF network element sends at least one piece of identification information used to identify a transmission channel in the transmission network #C3 and at least one piece of corresponding indication information, to the application server.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

It should be noted that in the transmission network #C3, the application server is a transmit end of downlink transmission. Therefore, the transmission channel identified by the at least one piece of identification information may include only the downlink transmission channel used for downlink transmission.

S512: The application server sends the acknowledgment message to the SMF network element, where the acknowledgment message indicates that the application server successfully receives the at least one piece of identification information and the at least one piece of corresponding indication information that are sent by the SMF network element in step S511.

S513: The SMF network element sends at least one piece of identification information used to identify a transmission channel in the transmission network #C1 and at least one piece of corresponding indication information, to the AMF network element.

For example, the SMF network element may send a Nsmf PDU session establishment context response (Nsmf_PDU_session_create SM context response) message. The message includes the at least one piece of identification information used to identify the transmission channel in the transmission network #C1 and the at least one piece of corresponding indication information.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

It should be noted that because the at least one piece of identification information and the at least one piece of identification information are information finally sent to the target access network device, and in the transmission network #C1, the target access network device is a transmit end of uplink transmission, the transmission channel identified by the at least one piece of identification information may include only an uplink transmission channel used for uplink transmission.

It should be understood that sequence numbers of steps S507, S509, S511, and S513 do not mean an execution sequence. The execution sequence of the steps should be determined based on functions and internal logic of the steps. For example, steps S507, S509, S511, and S513 may be performed at the same time.

S514: The AMF network element sends the at least one piece of identification information and the at least one piece of corresponding indication information that are received in step S513, to the target access network device.

For example, the AMF network element may send an N2 path switch request acknowledgment (N2 path switch request Ack) message, and the message includes the at least one piece of identification information and the at least one piece of corresponding indication information.

To be specific, the AMF network element forwards or transparently transmits the at least one piece of identification information and the at least one piece of corresponding indication information that are received in step S513.

It should be noted that as described in step S502, if there are a plurality of SMF network elements related to the plurality of PDU sessions that need to be switched in S501, the AMF network element further sends an N2 SM information message to an SMF network element other than the SMF network element shown in FIG. 5. In this way, in step S513, the AMF receives a Nsmf PDU session establishment context response message sent by the network element other than the SMF network element shown in FIG. 5. In step S514, the AMF network element aggregates Nsmf PDU session establishment context response messages sent by all SMF network elements, and sends, by using the N2 path switch request Ack message, the aggregated Nsmf PDU session establishment context response messages to the target access network device.

S515: The target access network device sends a release message of a resource to the source access network device, where the release message of the resource is used to indicate that the terminal device is successfully switched from the source access network device to the target access network device.

In this way, after receiving the release message of the resource, the source access network device releases an air interface resource between the source access network device and the terminal device.

S516: When the timer in step 518 expires, the SMF sends an N4 session release request (N4 session release request) message to the source UPF network element, to start a process of releasing the resource of the source UPF network element.

S517: The source UPF network element sends an N4 session release response (N4 session release response) message to the SMF network element, to confirm release of the resource.

S518: The SMF network element sends a release message of the transmission channel to the UDM network element, where the release message of the transmission channel includes identification information of a transmission channel that is not used to transmit the packet any more and a packet sending frequency of a corresponding packet flow.

For example, after the terminal device is switched to the target access network device, if the transmission channel determined by the SMF network element between the source access network device and the source UPF network element cannot be used, the release message of the transmission channel includes identification information used to identify the transmission channel determined by the SMF network element between the source access network device and the source UPF network element and the packet sending frequency of the corresponding packet flow.

For another example, if the SMF network element reselects a UPF network element, and the SMF network element determines that the transmission channel between the source access network device and the source UPF network element and the transmission channel between the source UPF network element and the anchor UPF network element cannot be used, the release message of the transmission channel also includes identification information used to identify the transmission channel between the source access network device and the source UPF network element and a packet sending frequency of the corresponding packet flow, and the release information of the transmission channel includes identification information used to indicate the transmission channel between the source UPF network element and the anchor UPF network element and the packet sending frequency of the corresponding packet flow.

The UDM network element determines, based on the identifier of the transmission channel, a packet sending frequency currently supported by each transmission channel, and adds a packet sending frequency of a corresponding packet flow to a packet sending frequency of each transmission channel, to generate updated frequency information of the transmission channel.

S519: The UDM network element sends the acknowledgment message to the SMF network element, where the acknowledgment message is used to indicate that the UDM network element successfully releases a packet sending frequency occupied in the transmission channel.

Figure 6:
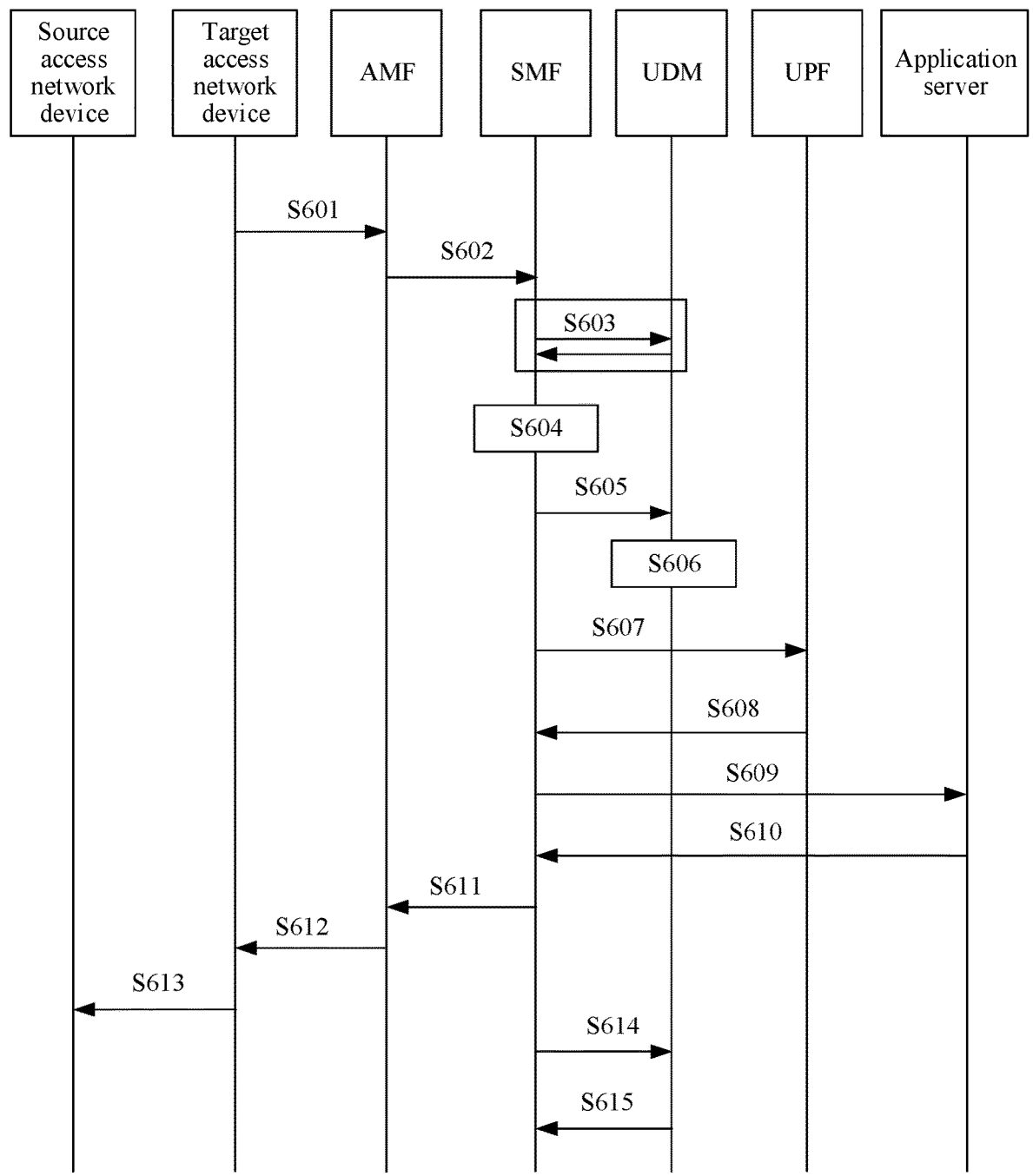
FIG. 6 is a schematic flowchart of an information transmission method according to still another embodiment of this application.

FIG. 6 is a schematic flowchart of an information transmission method 600 according to still another embodiment of this application. In the method 600, a process of transmitting information between network elements in a scenario in which a UPF network element is not reselected during switching an access network device is described by using an example in which an SMF network element is used as a control device, any one of the access network device, the UPF network element, or an application server is used as a network device #A, and a UDM network element is used as a network device #C.

In the method, a network architecture further includes an AMF network element and a UDM network element. The access network device includes a source access network device and a target access network device. Herein, a transmission network between the target access network device and the UPF network element is denoted as a transmission network #D1, and a transmission network between the UPF network element and the application server is denoted as a transmission network #D2.

S601: A target access network device sends an N2 path switch request (N2 path switch request) message to an AMF network element, where the N2 path switch request message is used to notify that a terminal device has moved to a new cell and a plurality of PDU sessions that need to be switched.

S602: The AMF network element sends an N2 SM information message to the SMF network element.

For related descriptions of this step, refer to the descriptions of step S502 in the foregoing method 500. Details are not described herein again.

S603: The SMF network element obtains, from a UDM network element, transmission channel information of all transmission channels pre-configured by a system for a transmission network #D1 and a transmission network #D2.

For related descriptions of this step, refer to the descriptions of step S503 in the foregoing method 500. Details are not described herein again.

S604: The SMF selects a UPF network element.

For example, the SMF network element needs to determine whether a current UPF network element can meet a requirement of a packet flow. A specific determining condition includes at least the following condition: When a UPF is not changed, whether a transmission channel between the current UPF network element and the application server can meet a performance requirement of the packet flow. If the current UPF network element meets the foregoing determining condition, after determining that the current UPD network element does not need to be switched, the SMF network element selects a transmission channel between the target access network device and the UPF network element and/or the transmission channel between the UPF network element and the application server.

Herein, the transmission channel between the current UPF network element and the application server may be a transmission channel that has been selected by the SMF network element for the packet flow, or may be another transmission channel pre-configured between the UPF network element and the application server.

By way of example, and not limitation, when determining whether the transmission channel meets the performance requirement of the packet flow, whether the transmission channel that has been selected by the SMF network element for the packet flow meets the performance requirement of the packet flow may be first determined. If the transmission channel does not meet the performance requirement of the packet flow, whether another transmission channel preconfigured between the UPF network element and the application server meets the performance requirement of the packet flow is then determined.

In addition, when the transmission channel that meets the requirement of the packet flow is the another transmission channel, the SMF network element needs to reselect a transmission channel between the UPF network element and the application server. For a manner in which the SMF network element determines whether the transmission channel meets the performance requirement of the packet flow (or the manner in which the SMF network element selects the transmission channel for the packet flow), refer to the foregoing related descriptions. Details are not described herein again.

S605: The SMF network element sends a request message of the transmission channel to the UDM network element.

For related descriptions of this step, refer to the descriptions of step S505 in the foregoing method 500. Details are not described herein again.

S606: The UDM network element determines, based on an identifier of the transmission channel, a packet sending frequency currently supported by each transmission channel, and subtracts a packet sending frequency of a corresponding packet flow from the packet sending frequency of each transmission channel, to generate updated frequency information of the transmission channel.

When the SMF subsequently sends request information used to request the information about the transmission channel, to the UDM network element, the information that is about the transmission channel and that is sent by the UDM network element includes the updated frequency information of the transmission channel.

S607: The SMF network element sends at least one piece of identification information used to identify a transmission channel in the transmission network #D1 and the transmission network #D2 and at least one piece of corresponding indication information, to a target UPF network element.

For example, the SMF network element may send an N4 session establishment/modification request (N4 session establishment/modification request) message. The message includes the at least one piece of identification information used to identify the transmission channel in the transmission network #D1 and the transmission network #D2 and the at least one piece of corresponding indication information.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

It should be noted that in the transmission network #D1, the UPF network element is a transmit end of downlink transmission, and in the transmission network #D2, the UPF network element is a transmit end of uplink transmission. The transmission channel identified by the at least one piece of identification information includes an uplink transmission channel used for uplink transmission and a downlink transmission channel used for downlink transmission. For specific descriptions, refer to related descriptions of step S311 in the method 300.

S608: The UPF network element sends an acknowledgment message to the SMF network element, where the acknowledgment message indicates that the UPF network element successfully receives the at least one piece of identification information and the at least one piece of corresponding indication information that are sent by the SMF network element in step S607.

For example, when the at least one piece of identification information used to identify the transmission channel in the transmission network #D1 and the transmission network #D2 and the at least one piece of corresponding indication information are carried in the N4 session establishment/modification request message, the acknowledgment message may be an N4 session establishment/modification response (N4 session establishment/modification response) message.

S609: The SMF network element sends at least one piece of identification information used to identify a transmission channel in the transmission network #D2 and the at least one piece of corresponding indication information, to an application server.

Each piece of indication information is used to indicate the at least one packet flow to which the packet flow belongs, where a packet transmitted on the corresponding transmission channel belongs to the packet flow. For specific descriptions of the identification information and the corresponding indication information, refer to the foregoing descriptions of the first identification information and the first indication information. Details are not described herein again.

It should be noted that in the transmission network #D2, the application server is a transmit end of downlink transmission. Therefore, the transmission channel identified by the at least one piece of identification information may include only a downlink transmission channel used for downlink transmission.

S610: The application server sends the acknowledgment message to the SMF network element, where the acknowledgment message indicates that the application server successfully receives the at least one piece of identification information and the at least one piece of corresponding indication information that are sent by the SMF network element in step S609.

S611: The SMF network element sends at least one piece of identification information used to identify a transmission channel in the transmission network #D1 and the at least one piece of corresponding indication information, to the AMF network element.

For example, the SMF network element may send a Nsmf PDU session establishment context response (Nsmf PDU session create SM context response) message. The message includes the at least one piece of identification information used to identify the transmission channel in the transmission network #D1 and the at least one piece of corresponding indication information.

It should be noted that because the at least one piece of identification information and the at least one piece of identification information are information finally sent to the target access network device, and in the transmission network #D1, the target access network device is a transmit end of uplink transmission, the transmission channel identified by the at least one piece of identification information may include only an uplink transmission channel used for uplink transmission.

It should be understood that sequence numbers of steps S607, S609, and S611 do not mean an execution sequence. The execution sequence of the steps should be determined based on functions and internal logic of the steps. For example, steps S607, S609, and S611 may be performed at the same time.

S612: The AMF network element sends the at least one piece of identification information and the at least one piece of corresponding indication information that are received in step S611, to the target access network device.

For example, the AMF network element may send a correct N2 path switch request acknowledgment (N2 path switch request Ack) message, and the message includes the at least one piece of identification information and the at least one piece of corresponding indication information that are received in step S611.

To be specific, the AMF network element forwards or transparently transmits the at least one piece of identification information and the at least one piece of corresponding indication information that are received in step S611.

S613: The target access network device sends a release message of a resource to a source access network device, where the release message of the resource is used to indicate that the terminal device is successfully switched from the source access network device to the target access network device.

In this way, after receiving the release message of the resource, the source access network device releases an air interface resource between the source access network device and the terminal device.

S614: The SMF network element sends a release message of the transmission channel to the UDM network element, where the release message of the transmission channel includes identification information of a transmission channel that is not used to transmit a packet any more and that is in a transmission network and a packet sending frequency of a corresponding packet flow.

The UDM network element determines, based on the identifier of the transmission channel, a packet sending frequency currently supported by each transmission channel, and adds the packet sending frequency of the corresponding packet flow to a packet sending frequency of each transmission channel, to generate updated frequency information of the transmission channel.

S615: The UDM network element sends the acknowledgment message to the SMF network element, where the acknowledgment message is used to indicate that the UDM network element successfully releases a packet sending frequency occupied in the transmission channel.

Therefore, in the information transmission method in this embodiment of this application, according to one aspect, the control device determines, in the at least one transmission channel configured between the first network device and the second network device, the first transmission channel used to transmit the packet that belongs to the at least one packet flow. In addition, by using the identification information used to identify the first transmission channel, the first network device may determine that the first transmission channel can be used to transmit the packet that belongs to the at least one packet flow. The packet sending frequency of the first transmission channel is greater than or equal to the packet sending frequency of the at least one packet flow, and the transmission performance of the first transmission channel meets the transmission performance of the at least one packet flow. Therefore, when sending the packet that belongs to the at least one packet flow, the first network device may send the packet based on the packet sending frequency of the first transmission channel by using the first transmission channel, so that a transmission delay of the packet may be effectively reduced, and a requirement for transmission performance of a packet in a mobile network may further be met.

According to another aspect, the control device sends the frequency information that is of the first packet flow and that is used to indicate the packet sending frequency of each of the at least one packet flow, to the terminal device, so that the terminal device may send the packet by using the packet sending frequency corresponding to the packet flow to which the packet belongs. Therefore, a problem in which transmission performance of the packet of the another packet flow is affected may be effectively avoided because the terminal device sends the packet based on the packet sending frequency of the packet flow.

According to still another aspect, the control device sends the second identification information and the frequency information of the second packet flow to the third network device, so that the third network device may update the packet sending frequency of the first transmission channel based on the second identification information and the frequency information of the second packet flow in real time. In this way, the packet sending frequency that can be currently supported by the first transmission channel can be accurately reflected, and real and valid data is provided for another packet flow to select a transmission channel, thereby ensuring normal transmission of the packet in all packet flows as much as possible.

It should be understood that sequence numbers of the foregoing processes do not mean execution sequences in various embodiments of this application. The execution sequences of the processes should be determined based on functions and internal logic of the processes, but should not constitute any limitation on the implementation processes of the embodiments of this application.

The information transmission methods according to the embodiments of this application are described above in detail with reference to FIG. 1 to FIG. 6. The following describes an information transmission apparatus according to the embodiments of this application with reference to FIG. 7 to FIG. 10. Technical features described in the method embodiments are also applicable to the following apparatus embodiments.

Figure 7:
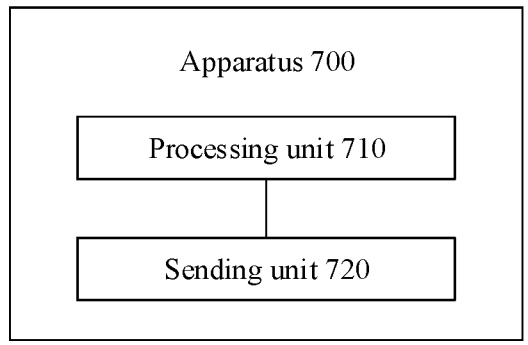
FIG. 7 to FIG. 10 are schematic block diagrams of an information transmission apparatus according to an embodiment of this application.

FIG. 7 is a schematic block diagram of an information transmission apparatus 700 according to an embodiment of this application. As shown in FIG. 7, the apparatus 700 includes:

a processing unit 710, configured to determine a first transmission channel in at least one transmission channel configured between a first network device and a second network device, where the first transmission channel is used to transmit a packet that belongs to at least one packet flow, a packet sending frequency currently supported by the first transmission channel is greater than or equal to a sum of packet sending frequencies of the at least one packet flow, and transmission performance of the first transmission channel meets transmission performance of the at least one packet flow; and a sending unit 720, configured to send first identification information to the first network device, where the first identification information is used to identify the first transmission channel.

Therefore, in the information transmission apparatus in this embodiment of this application, the apparatus determines, in the at least one transmission channel configured between the first network device and the second network device, the first transmission channel used to transmit the packet that belongs to the at least one packet flow. In addition, by using the identification information used to identify the first transmission channel, the first network device may determine that the first transmission channel can be used to transmit the packet that belongs to the at least one packet flow. A packet sending frequency of the first transmission channel is greater than or equal to a packet sending frequency of the at least one packet flow, and the transmission performance of the first transmission channel meets transmission performance of the at least one packet flow. Therefore, when sending the packet that belongs to the at least one packet flow, the first network device may send the packet based on the packet sending frequency of the first transmission channel by using the first transmission channel, so that a transmission delay of the packet may be effectively reduced, and a requirement for transmission performance of a packet in a mobile network may further be met.

Optionally, the sending unit 720 is further configured to:

send first indication information to the first network device, where the first indication information is used to indicate the at least one packet flow.

Optionally, the sending unit 720 is further configured to:

send frequency information of a first packet flow to a terminal device, where the frequency information of the first packet flow is used to indicate a packet sending frequency of each of the at least one packet flow.

Therefore, in the information transmission apparatus provided in this embodiment of this application, the apparatus sends the frequency information that is of the first packet flow and that is used to indicate the packet sending frequency of each of the at least one packet flow, to the terminal device, so that the terminal device may send the packet by using the packet sending frequency corresponding to the packet flow to which the packet belongs. Therefore, a problem in which transmission performance of a packet of another packet flow is affected may be effectively avoided because the terminal device sends the packet based on the packet sending frequency of the packet flow.

Optionally, the sending unit 720 is further configured to:

send second identification information and frequency information of a second packet flow to a third network device, where the second identification information and the frequency information of the second packet flow are used to update the frequency information of the first transmission channel, and the frequency information of the first transmission channel is used to indicate the packet sending frequency currently supported by the first transmission channel, and the second identification information is used to identify the first transmission channel, and the frequency information of the second packet flow is used to indicate the packet sending frequency of each of the at least one packet flow or indicate a sum of packet sending frequencies of the at least one packet flow.

Therefore, in the information transmission apparatus in this embodiment of this application, the apparatus sends the second identification information and the frequency information of the second packet flow to the third network device, so that the third network device may update the packet sending frequency of the first transmission channel based on the second identification information and the frequency information of the second packet flow in real time. In this way, a packet sending frequency that can be currently supported by the first transmission channel can be accurately reflected, and real and valid data is provided for another packet flow to select a transmission channel, thereby ensuring normal transmission of the packet in all packet flows as much as possible.

Optionally, the processing unit 710 is further configured to:

determine frequency information of the first transmission channel based on the first transmission channel, where the frequency information of the first transmission channel is used to indicate a packet sending frequency currently supported by the first transmission channel;

obtain frequency information of a second packet flow, where the frequency information of the second packet flow is used to indicate a packet sending frequency of each of the at least one packet flow or indicate a sum of packet sending frequencies of the at least one packet flow; and generate updated frequency information of the first transmission channel based on the frequency information of the first transmission channel and the frequency information of the second packet flow.

Therefore, in the information transmission apparatus in this embodiment of this application, the apparatus updates the packet sending frequency of the first transmission channel by using the frequency information of the first transmission channel and the frequency information of the second packet flow in real time. In this way, a packet sending frequency that can be currently supported by the first transmission channel can be accurately reflected, and real and valid data is provided for another packet flow to select a transmission channel, thereby ensuring normal transmission of the packet in all packet flows as much as possible.

Optionally, the processing unit 710 is specifically configured to:

subtract, by the control device when the frequency information of the second packet flow is used to indicate the packet sending frequency of each of the at least one packet flow, the packet sending frequency of each packet flow from the packet sending frequency currently supported by the first transmission channel, to generate the updated frequency information of the first transmission channel;

add, by the control device when the frequency information of the second packet flow is used to indicate the packet sending frequency of each of the at least one packet flow, a packet sending frequency corresponding to each packet flow to the packet sending frequency currently supported by the first transmission channel, to generate the updated frequency information of the first transmission channel;

subtract, by the control device when the frequency information of the second packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or add, by the control device when the frequency information of the second packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel.

Optionally, the processing unit 710 is specifically configured to:

determine the first transmission channel in the at least one transmission channel based on transmission performance of each of the at least one packet flow, transmission performance of each of the at least one transmission channel, the packet sending frequency of each of the at least one packet flow, and a packet sending frequency currently supported by each of the at least one transmission channel.

Optionally, the first network device is any one of the following devices: an access network device, a user plane function network element, or an application server.

The information transmission apparatus 700 may correspond to (for example, may be configured in or may be) the control device described in the method 200, and various modules or units in the information transmission apparatus 700 are respectively configured to perform the operations or the processing processes performed by the control device in the method 200. To avoid repetition, details are omitted herein.

In this embodiment of this application, the apparatus 700 may be the control device. In this case, the apparatus 700 may include a processor, a transmitter, and a receiver. The processor, the transmitter, and the receiver are communicatively connected. Optionally, the apparatus further includes a memory. The memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the processing unit 710 in the apparatus 700 shown in FIG. 7 may correspond to the processor, and the sending unit 720 in the apparatus 700 shown in FIG. 7 may correspond to the transmitter. In another implementation, the transmitter and the receiver may be implemented by a same component, namely, a transceiver.

In this embodiment of this application, the apparatus 700 may be a chip (or a chip system) installed in the control device. In this case, the apparatus 700 may include a processor and an input/output interface. The processor may be communicatively connected to a transceiver of the network device by using the input/output interface. Optionally, the apparatus further includes a memory. The memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the processing unit 710 in the apparatus 700 shown in FIG. 7 may correspond to the processor, and the sending unit 720 in the apparatus 700 shown in FIG. 7 may correspond to an output interface.

Figure 8:
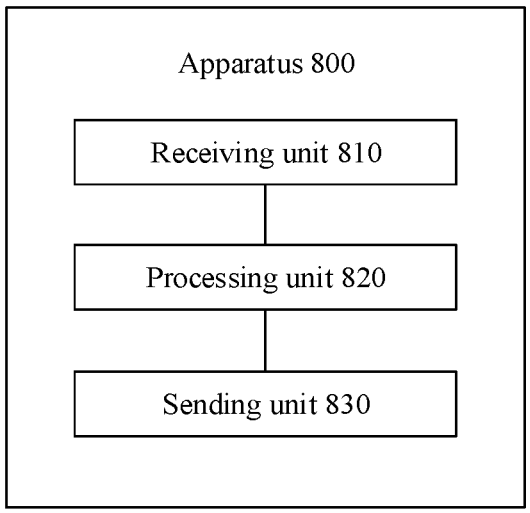

FIG. 8 is a schematic block diagram of an information transmission apparatus 800 according to an embodiment of this application. As shown in FIG. 8, the apparatus 800 includes:

a receiving unit 810, configured to receive first identification information from a control device, where the first identification information is used to identify a first transmission channel in at least one transmission channel configured between a first network device and a second network device, and the first transmission channel is used to transmit a sum of packet sending frequencies belonging to at least one packet flow, and transmission performance of the first transmission channel meets transmission performance of the at least one packet flow;

a processing unit 820, configured to determine that a packet flow to which a first packet belongs to the at least one packet flow; and a sending unit 830, configured to send, based on a packet sending frequency of the first transmission channel by using the first transmission channel, a second packet generated based on the first packet.

Therefore, in the information transmission apparatus in this embodiment of this application, the apparatus receives identification information that is used to identify the first transmission channel and that is sent by the control device, so that the apparatus may determine that the first transmission channel can be used to transmit the packet that belongs to the at least one packet flow. The packet sending frequency of the first transmission channel is greater than or equal to the packet sending frequency of the at least one packet flow, and the transmission performance of the first transmission channel meets the transmission performance of the at least one packet flow. Therefore, when sending the packet that belongs to the at least one packet flow, the first network device may send the packet based on the packet sending frequency of the first transmission channel by using the first transmission channel, so that a transmission delay of the packet may be effectively reduced, and a requirement for transmission performance of a packet in a mobile network may further be met.

Optionally, the receiving unit 810 is further configured to receive first indication information from the control device, where the first indication information is used to indicate at least one packet flow; and the processing unit 820 is specifically configured to determine, based on the first indication information and a field of the first packet, that the packet flow to which the first packet belongs to the at least one packet flow, where the field of the first packet is used to indicate the at least one packet flow.

Optionally, the apparatus is any one of the following devices: an access network device, a user plane function network element, or an application server.

The information transmission apparatus 800 may correspond to (for example, may be configured in or may be) the first network device described in the method 200. The first network device may be an access network device, a UPF network element, or an application server, and modules or units in the information transmission apparatus 800 are respectively configured to perform the operations or processing processes performed by the first network device in the foregoing method 200. To avoid repetition, details are omitted herein.

In this embodiment of this application, the apparatus 800 may be the first network device. In this case, the apparatus 800 may include a processor, a transmitter, and a receiver. The processor, the transmitter, and the receiver are communicatively connected. Optionally, the apparatus further includes a memory. The memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 810 in the apparatus 800 shown in FIG. 8 may correspond to the receiver, the processing unit 820 in the apparatus 800 shown in FIG. 8 may correspond to the processor, and the sending unit 830 in the apparatus 800 shown in FIG. 8 may correspond to the transmitter. In another implementation, the transmitter and the receiver may be implemented by a same component, namely, a transceiver.

In this embodiment of this application, the apparatus 800 may be a chip (or a chip system) installed in the first network device. In this case, the apparatus 800 may include a processor and an input/output interface. The processor may be communicatively connected to a transceiver of the network device by using the input/output interface. Optionally, the apparatus further includes a memory. The memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 810 in the apparatus 800 shown in FIG. 8 may correspond to an input interface, the processing unit 820 in the apparatus 800 shown in FIG. 8 may correspond to the processor, and the sending unit 830 in the apparatus 800 shown in FIG. 8 may correspond to an output interface.

Figure 9:
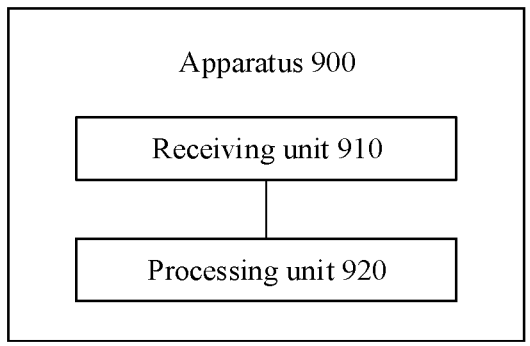

FIG. 9 is a schematic block diagram of an information transmission apparatus 900 according to an embodiment of this application. As shown in FIG. 9, the apparatus 900 includes:

a receiving unit 910, configured to receive identification information and frequency information of a packet flow from a control device, where the identification information is used to identify a first transmission channel in at least one transmission channel configured between a first network device and a second network device, the first transmission channel is used to transmit a packet that belongs to at least one packet flow, and the frequency information of the packet flow is used to indicate a packet sending frequency of each of the at least one packet flow or indicate a sum of packet sending frequencies of the at least one packet flow; and a processing unit 920, configured to determine frequency information of the first transmission channel based on the identification information, where the frequency information of the first transmission channel is used to indicate a packet sending frequency currently supported by the first transmission channel; and the processing unit 930 is further configured to generate updated frequency information of the first transmission channel based on the frequency information of the first transmission channel and the frequency information of the packet flow.

Therefore, in the information transmission apparatus in this embodiment of this application, the apparatus receives second identification information and frequency information of a second packet flow that are sent by the control device, so that the apparatus may update the packet sending frequency of the first transmission channel based on the second identification information and the frequency information of the second packet flow in real time.

In this way, a packet sending frequency that can be currently supported by the first transmission channel can be accurately reflected, and real and valid data is provided for another packet flow to select a transmission channel, thereby ensuring normal transmission of the packet in all packet flows as much as possible.

Optionally, the processing unit 920 is specifically configured to:

subtract, when the frequency information of the packet flow is used to indicate the packet sending frequency of each of the at least one packet flow, the packet sending frequency of each packet flow from the packet sending frequency currently supported by the first transmission channel, to generate the updated frequency information of the first transmission channel;

add, when the frequency information of the packet flow is used to indicate the packet sending frequency of each of the at least one packet flow, a packet sending frequency corresponding to each packet flow to the packet sending frequency currently supported by the first transmission channel, to generate the updated frequency information of the first transmission channel;

subtract, when the frequency information of the packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or add, when the frequency information of the packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel.

The information transmission apparatus 900 may correspond to (for example, may be configured in or may be) the third network device described in the method 200, and various modules or units in the information transmission apparatus 900 are respectively configured to perform the operations or the processing processes performed by the third network device in the method 200. To avoid repetition, details are omitted herein.

In this embodiment of this application, the apparatus 900 may be the third network device. In this case, the apparatus 900 may include a processor, a transmitter, and a receiver. The processor, the transmitter, and the receiver are communicatively connected. Optionally, the apparatus further includes a memory. The memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 99 in the apparatus 900 shown in FIG. 9 may correspond to the receiver, and the processing unit 920 in the apparatus 900 shown in FIG. 9 may correspond to the processor.

In this embodiment of this application, the apparatus 900 may be a chip (or a chip system) installed in the third network device. In this case, the apparatus 900 may include a processor and an input/output interface. The processor may be communicatively connected to a transceiver of the network device by using the input/output interface. Optionally, the apparatus further includes a memory. The memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 910 in the apparatus 900 shown in FIG. 9 may correspond to an input interface, and the processing unit 920 in the apparatus 900 shown in FIG. 9 may correspond to the processor.

Figure 10:
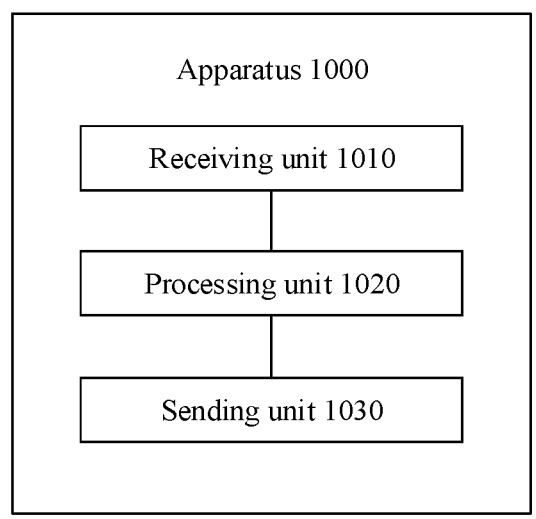

FIG. 10 is a schematic block diagram of an information transmission apparatus 1000 according to an embodiment of this application. As shown in FIG. 10, the apparatus 1000 includes:

a receiving unit 1010, configured to receive frequency information of a first packet flow from a control device, where the frequency information of the first packet flow is used to indicate a packet sending frequency of each of at least one packet flow;

a processing unit 1020, configured to determine, in the frequency information of the first packet flow based on a packet flow to which a packet belongs, a packet sending frequency of the packet flow to which the packet belongs, where the packet flow belongs to the at least one packet flow; and a sending unit 1030, configured to send the packet based on the packet sending frequency of the packet flow to which the packet belongs.

Therefore, in the information transmission apparatus provided in this embodiment of this application, the apparatus receives frequency information that is of the first packet flow, that is used to indicate the packet sending frequency of each of the at least one packet flow, and that is sent by the control device, so that the apparatus may send the packet by using the packet sending frequency corresponding to the packet flow to which the packet belongs. Therefore, a problem in which transmission performance of a packet of another packet flow is affected may be effectively avoided because the apparatus sends the packet based on the packet sending frequency of the packet flow.

The information transmission apparatus 1000 may correspond to (for example, may be configured in or may be) the terminal device described in the method 200, and various modules or units in the information transmission apparatus 1000 are respectively configured to perform the operations or the processing processes performed by the terminal device in the method 200. To avoid repetition, details are omitted herein.

In this embodiment of this application, the apparatus 1000 may be the terminal device. In this case, the apparatus 1000 may include a processor, a transmitter, and a receiver. The processor, the transmitter, and the receiver are communicatively connected. Optionally, the apparatus further includes a memory. The memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 1010 in the apparatus 1000 shown in FIG. 10 may correspond to the receiver, the processing unit 1020 in the apparatus 1000 shown in FIG. 10 may correspond to the processor, and the sending unit 1030 in the apparatus 1000 shown in FIG. 10 may correspond to the transmitter. In another implementation, the transmitter and the receiver may be implemented by a same component, namely, a transceiver.

In this embodiment of this application, the apparatus 1000 may be a chip (or a chip system) installed in the terminal device. In this case, the apparatus 1000 may include a processor and an input/output interface. The processor may be communicatively connected to a transceiver of the network device by using the input/output interface. Optionally, the apparatus further includes a memory. The memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 1010 in the apparatus 1000 shown in FIG. 10 may correspond to an input interface, the processing unit 1020 in the apparatus 1000 shown in FIG. 10 may correspond to the processor, and the sending unit 1030 in the apparatus 1000 shown in FIG. 10 may correspond to an output interface.

It should be noted that the foregoing method embodiments in the embodiments of this application may be applied to a processor, or implemented by a processor. The processor may be an integrated circuit chip and has a signal processing capability. In an implementation process, steps in the foregoing method embodiments may be implemented by using a hardware integrated logical circuit in the processor, or by using instructions in a form of software. The foregoing processor may be a general-purpose processor, a digital signal processor (digital signal processor, DSP), an application-specific integrated circuit (application specific integrated circuit, ASIC), a field programmable gate array (field programmable gate array, FPGA), another programmable logical device, a discrete gate, a transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to the memories and any memory of another proper type.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
   determining, by a control device, a first transmission channel in at least one transmission channel configured between a first network device and a second network device, wherein the first transmission channel is used to transmit a packet that belongs to at least one packet flow, a packet sending frequency currently supported by the first transmission channel is greater than or equal to a sum of packet sending frequencies of the at least one packet flow, and transmission performance of the first transmission channel meets a transmission performance of the at least one packet flow; and
   sending, by the control device, first identification information to the first network device, wherein the first identification information is used to identify the first transmission channel,
   wherein the determining, by a control device, a first transmission channel in at least one transmission channel configured between a first network device and a second network device comprises:
   determining, by the control device, the first transmission channel in the at least one transmission channel based on transmission performance of each of the at least one packet flow, transmission performance of a transmission channel in the at least one transmission channel, the packet sending frequency of each of the at least one packet flow, and a packet sending frequency currently supported by the transmission channel in the at least one transmission channel.

2. The method according to claim 1, further comprising:
   sending, by the control device, first indication information to the first network device, wherein the first indication information is used to indicate the at least one packet flow.

3. The method according to claim 1, further comprising:
   sending, by the control device, frequency information of a first packet flow in the at least one packet flow to a terminal device, wherein the frequency information of the first packet flow is used to indicate a packet sending frequency of each of the at least one packet flow.

4. The method according to claim 1, further comprising:
   sending, by the control device, second identification information and frequency information of a second packet flow in the at least one packet flow to a third network device, wherein the second identification information and the frequency information of the second packet flow are used to update frequency information of the first transmission channel, and the frequency information of the first transmission channel is used to indicate the packet sending frequency currently supported by the first transmission channel; and
   the second identification information is used to identify the first transmission channel, and the frequency information of the second packet flow is used to indicate the packet sending frequency of each of the at least one packet flow or indicate the sum of the packet sending frequencies of the at least one packet flow.

5. The method according to claim 1, further comprising:
   determining, by the control device, frequency information of the first transmission channel based on the first transmission channel, wherein the frequency information of the first transmission channel is used to indicate the packet sending frequency currently supported by the first transmission channel;
   obtaining, by the control device, frequency information of a second packet flow, wherein the frequency information of the second packet flow is used to indicate the packet sending frequency of each of the at least one packet flow or indicate the sum of the packet sending frequencies of the at least one packet flow; and generating, by the control device, updated frequency information of the first transmission channel based on the frequency information of the first transmission channel and the frequency information of the second packet flow.

6. The method according to claim 5, wherein the generating, by the control device, updated frequency information of the first transmission channel based on the frequency information of the first transmission channel and the frequency information of the second packet flow comprises one of:
   subtracting, by the control device when the frequency information of the second packet flow is used to indicate the packet sending frequency of each of the at least one packet flow, the packet sending frequency of each packet flow from the packet sending frequency currently supported by the first transmission channel, to generate the updated frequency information of the first transmission channel;
   adding, by the control device when the frequency information of the second packet flow is used to indicate the packet sending frequency of each of the at least one packet flow, a packet sending frequency corresponding to each packet flow to the packet sending frequency currently supported by the first transmission channel, to generate the updated frequency information of the first transmission channel;
   subtracting, by the control device when the frequency information of the second packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or
   adding, by the control device when the frequency information of the second packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel.

7. The method according to claim 1, wherein the first network device is any one of the following devices: an access network device, a user plane function network element, or an application server.

8. An information transmission method, comprising:
   receiving, by a first network device, first identification information from a control device, wherein the first identification information is used to identify a first transmission channel in at least one transmission channel configured between the first network device and a second network device, the first transmission channel is used to transmit a packet that belongs to at least one packet flow, a packet sending frequency currently supported by the first transmission channel is greater than or equal to a sum of packet sending frequencies of the at least one packet flow, and a transmission performance of the first transmission channel meets transmission performance of the at least one packet flow;
   determining, by the first network device, that a packet flow to which a first packet belongs is the at least one packet flow; and
   sending, by the first network device based on a packet sending frequency of the first transmission channel by using the first transmission channel, a second packet generated based on the first packet,
   wherein the first transmission channel in the at least one transmission channel is determined based on transmission performance of each of the at least one packet flow transmission performance of a transmission channel in the at least one transmission channel, the packet sending frequency of each of the at least one packet flow and a packet sending frequency currently supported by the transmission channel in the at least one transmission channel.

9. The method according to claim 8, further comprising:
   receiving, by the first network device, first indication information from the control device, wherein the first indication information is used to indicate the at least one packet flow; and
   the determining, by the first network device, that a packet flow to which a first packet belongs is the at least one packet flow comprises:
   determining, by the first network device based on the first indication information and a field of the first packet, that the packet flow to which the first packet belongs is the at least one packet flow, wherein the field of the first packet is used to indicate the at least one packet flow.

10. The method according to claim 8, wherein the first network device is any one of the following devices: an access network device, a user plane function network element, or an application server.

11. An information transmission method, comprising:
    receiving, by a third network device, identification information and frequency information of a packet flow from a control device, wherein the identification information is used to identify a first transmission channel in at least one transmission channel configured between a first network device and a second network device, the first transmission channel is used to transmit a packet that belongs to at least one packet flow, and the frequency information of the packet flow is used to indicate a packet sending frequency of each of the at least one packet flow or indicate a sum of packet sending frequencies of the at least one packet flow;
    determining, by the third network device, frequency information of the first transmission channel based on the identification information, wherein the frequency information of the first transmission channel is used to indicate a packet sending frequency currently supported by the first transmission channel; and
    generating, by the third network device, updated frequency information of the first transmission channel based on the frequency information of the first transmission channel and the frequency information of the packet flow.

12. The method according to claim 11, wherein the generating, by the third network device, updated frequency information of the first transmission channel based on the frequency information of the first transmission channel and the frequency information of the packet flow comprises one of:
    subtracting, by the third network device when the frequency information of the packet flow is used to indicate the packet sending frequency of each of the at least one packet flow, the packet sending frequency of each packet flow from the packet sending frequency currently supported by the first transmission channel, to generate the updated frequency information of the first transmission channel;

adding, by the third network device when the frequency information of the packet flow is used to indicate the packet sending frequency of each of the at least one packet flow, a packet sending frequency corresponding to each packet flow to the packet sending frequency currently supported by the first transmission channel, to generate the updated frequency information of the first transmission channel;

subtracting, by the third network device when the frequency information of the packet flow is used to indicate the sum of the packet sending frequencies of the at least one packet flow, the sum of the packet sending frequencies of the at least one packet flow from the packet sending frequency currently supported by the first transmission channel, to generate the updated frequency information of the first transmission channel; or adding, by the third network device when the frequency information of the packet flow is used to indicate the sum of the packet sending frequencies of the at least one packet flow, the sum of the packet sending frequencies of the at least one packet flow to the packet sending frequency currently supported by the first transmission channel, to generate the updated frequency information of the first transmission channel.

* * * * *

UNITED STATES PATENT AND TRADEMARK OFFICE
CERTIFICATE OF CORRECTION

PATENT NO. : 11,483,735 B2
APPLICATION NO. : 16/934789
DATED : October 25, 2022
INVENTOR(S) : Su et al.

Page 1 of 1

It is certified that error appears in the above-identified patent and that said Letters Patent is hereby corrected as shown below:

On the Title Page

Page 2: item (56) U.S. Patent Documents, Column 1, Line 8: "2002/0001114 A1* 1/2002 Fames" should read -- 2002/0001114 A1* 1/2002 Farries --.

Signed and Sealed this
Twenty-eighth Day of March, 2023

Katherine Kelly Vidal
*Director of the United States Patent and Trademark Office*